US012811461B2

(12) United States Patent
Kataoka et al.

(10) Patent No.: US 12,811,461 B2
(45) Date of Patent: Nov. 24, 2026

(54) MOTOR AND PUMP

(71) Applicant: NIDEC POWERTRAIN SYSTEMS CORPORATION, Kanagawa (JP)

(72) Inventors: Shigehiro Kataoka, Kanagawa (JP); Hirotaka Kanamono, Kanagawa (JP); Keita Kobayashi, Kanagawa (JP)

(73) Assignee: NIDEC POWERTRAIN SYSTEMS CORPORATION, Kanagawa (JP)

( * ) Notice: Subject to any disclaimer, the term of this patent is extended or adjusted under 35 U.S.C. 154(b) by 397 days.

(21) Appl. No.: 18/396,582

(22) Filed: Dec. 26, 2023

(65) Prior Publication Data

US 2024/0223040 A1 Jul. 4, 2024

(30) Foreign Application Priority Data

Dec. 28, 2022 (JP) ................................ 2022-212481

(51) Int. Cl.
*H02K 3/50* (2006.01)
*H02K 1/18* (2006.01)

(52) U.S. Cl.
CPC ................. *H02K 3/50* (2013.01); *H02K 1/18* (2013.01); *H02K 2203/03* (2013.01)

(58) Field of Classification Search
CPC ............. H02K 1/18; H02K 1/185; H02K 3/50
USPC ...................................................... 310/71, 89
See application file for complete search history.

(56) References Cited

U.S. PATENT DOCUMENTS

| | | | | |
|---|---|---|---|---|
| 5,990,589 A * | 11/1999 | Ushikoshi | H02K 3/522 310/90 |
| 8,896,169 B2 * | 11/2014 | Song | H02K 5/207 310/71 |
| 9,948,154 B2 | 4/2018 | Böhm et al. | |
| 2008/0211332 A1 * | 9/2008 | Kataoka | H02K 11/20 310/71 |
| 2013/0162098 A1 * | 6/2013 | Furuhashi | H02K 3/38 310/215 |
| 2013/0207491 A1 * | 8/2013 | Hatfield | H02K 21/12 310/71 |
| 2013/0234548 A1 * | 9/2013 | Oishi | H02K 29/08 29/598 |

(Continued)

FOREIGN PATENT DOCUMENTS

| | | |
|---|---|---|
| JP | 2016077141 | 5/2016 |
| JP | 2019062708 | 4/2019 |

(Continued)

*Primary Examiner* — Rashad H Johnson
(74) *Attorney, Agent, or Firm* — JCIPRNET

(57) ABSTRACT

This disclosure includes: a motor part having a rotor rotatable about a central axis and a stator facing the rotor in a radial direction with a gap therebetween; a circuit board arranged on an axial one side of the motor part; a connection terminal arranged between the stator and the circuit board in an axial direction; and a motor housing having a cylindrical shape that extends in the axial direction and accommodating the motor part. The stator includes an annular stator core; a coil having multiple coil bodies attached to the stator core; and an insulator arranged between the stator core and the coil. The connection terminal electrically connects the coil and the circuit board. The motor includes a terminal holder, which holds the connection terminal and is mounted on either the stator or the motor housing and moveable in a circumferential direction.

14 Claims, 14 Drawing Sheets

(56) References Cited

U.S. PATENT DOCUMENTS

| | | | | |
|---|---|---|---|---|
| 2014/0191598 | A1* | 7/2014 | Winheim | H02K 11/33 310/71 |
| 2015/0155764 | A1* | 6/2015 | Miyachi | H02K 3/50 310/71 |
| 2015/0187462 | A1* | 7/2015 | Kondo | B23P 11/00 310/71 |
| 2016/0036289 | A1* | 2/2016 | Kawata | H02K 5/225 310/71 |
| 2016/0156246 | A1* | 6/2016 | Hotori | H02K 5/225 310/43 |
| 2019/0149014 | A1* | 5/2019 | Haga | H02K 3/28 310/71 |
| 2019/0326687 | A1 | 10/2019 | Ochi | |
| 2022/0320941 | A1 | 10/2022 | Kataoka et al. | |
| 2023/0163653 | A1* | 5/2023 | Hong | H02K 3/522 310/71 |
| 2023/0170768 | A1* | 6/2023 | Nakamura | H02K 7/145 310/71 |

FOREIGN PATENT DOCUMENTS

| | | |
|---|---|---|
| JP | 2019192369 | 10/2019 |
| JP | 2021164219 | 10/2021 |
| JP | 2022150980 | 10/2022 |
| JP | 2022156066 | 10/2022 |

* cited by examiner

MOTOR AND PUMP

CROSS-REFERENCE TO RELATED APPLICATIONS

The present invention claims priority under 35 U.S.C. § 119 to Japanese Application No. 2022-212481 filed on Dec. 28, 2022, the entire content of which is incorporated herein by reference.

BACKGROUND

Field of the Invention

The disclosure provides a motor and a pump.

Background

A motor is known in which a stator winding included in a stator and a circuit board that supplies power to the stator winding are electrically connected via a guide plate. For example, there is known a motor having a structure for electrically connecting a stator winding and a circuit board by a guide plate held by a stator fixed to a motor housing.

In such a motor as described above, if the stator is fixed to the motor housing with its circumferential position displaced with respect to the motor housing, the circumferential position of the guide plate with respect to the circuit board is displaced. In this case, since the circumferential position of the guide plate cannot be aligned with the circuit board, there is a possibility that the connection between the guide plate and the circuit board becomes difficult. Thus, when the stator is mounted on the motor housing, it is necessary to increase the positional accuracy of the stator in the circumferential direction with respect to the motor housing, and this increases the number of manufacturing man-hours of the motor.

One of the purposes of this disclosure is to provide a motor and a pump that are able to suppress an increase in manufacturing man-hours in light of the above circumstances.

SUMMARY

One embodiment of the motor of this disclosure includes: a motor part having a rotor rotatable about the central axis, and a stator facing the rotor in a radial direction with a gap therebetween; a circuit board arranged on an axial one side of the motor part; a connection terminal arranged between the stator and the circuit board in an axial direction; and a motor housing having a cylindrical shape that extends in the axial direction and accommodating the motor part. The stator includes: an annular stator core; a coil having multiple coil bodies attached to the stator core; and an insulator arranged between the stator core and the coil. The connection terminal electrically connects the coil and the circuit board. The motor includes a terminal holder, which holds the connection terminal and is mounted on either the stator or the motor housing and moveable in the circumferential direction.

One embodiment of the pump includes motor and a pump mechanism connected to the rotor.

DETAILED DESCRIPTION

Figure 1:
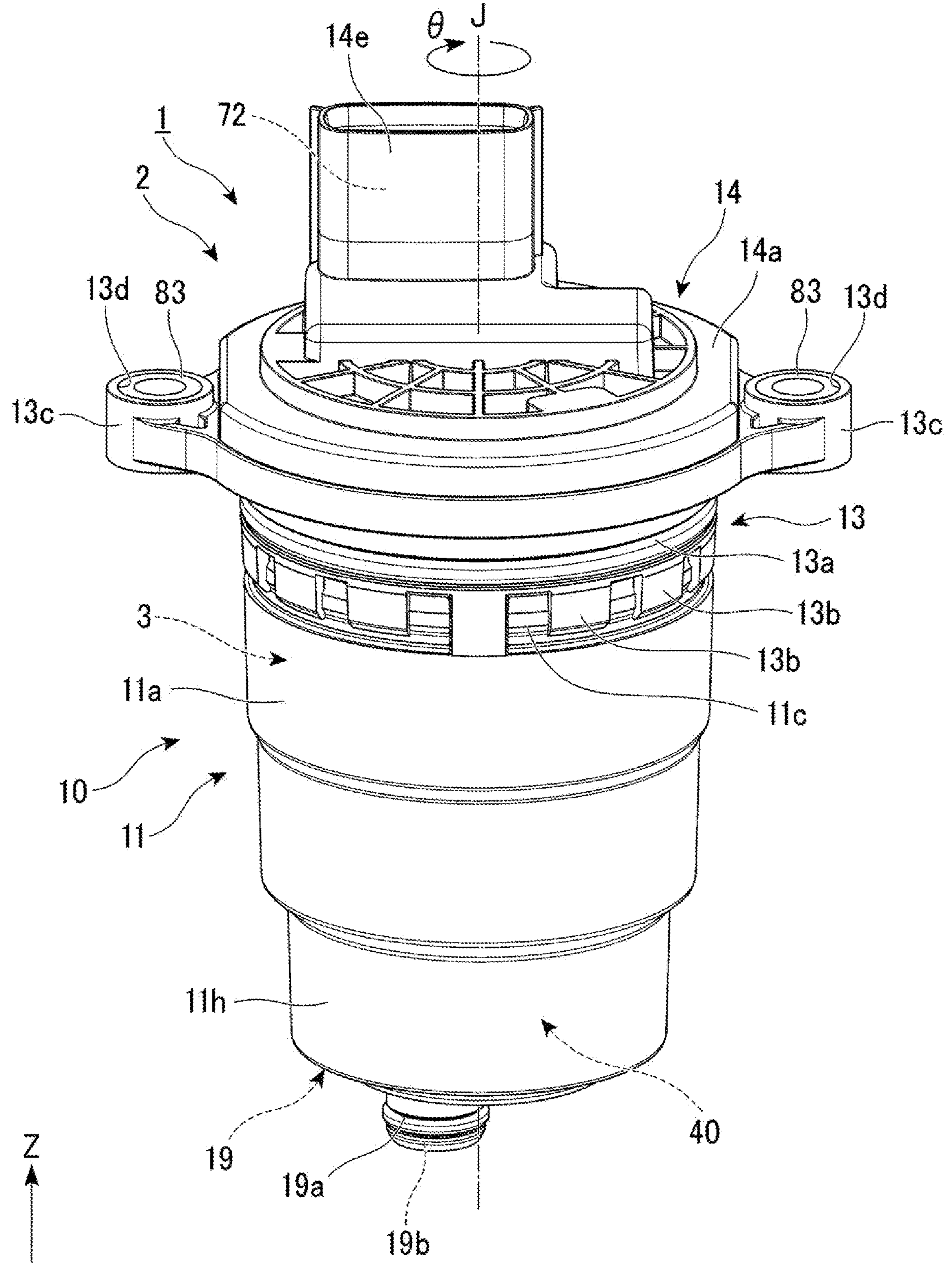
FIG. 1 is a perspective view showing a pump of a first embodiment.

According to one embodiment of this disclosure, it is possible to suppress an increase in the manufacturing man-hours of a motor and a pump.

The above and other elements, features, steps, characteristics and advantages of the present disclosure will become more apparent from the following detailed description of the preferred embodiments with reference to the attached drawings.

In the following description, a Z-axis is shown as appropriate in the drawing. The Z-axis indicates the direction in which a central axis J of the embodiments described below extends. The central axis J shown in each drawing is a virtual axis. In the following description, the direction in which the central axis J extends, namely the direction parallel to the Z-axis, is referred to as "axial direction". The radial direction centered on the central axis J is simply referred to as "radial direction". The circumferential direction centered on the central axis J is simply referred to as "circumferential direction". The side in the axial direction toward which the arrow of the Z-axis indicates (+Z side) is referred to as the "upper side" or "axial one side". The side in the axial direction opposite to the side that the arrow of the Z-axis indicates (−Z side) is referred to as the "lower side" or the "axial other side". Moreover, the upper side and the lower side are merely names for explaining relative positional relationship between respective parts, and the actual layout relationship or the like may be those other than the layout relationship or the like indicated by these names.

The circumferential direction is indicated by an arrow θ in each drawing. The side facing the arrow θ in the circumferential direction is referred to as "circumferential one side". The side in the circumferential direction opposite to the direction that the arrow θ indicates is referred to as "circumferential other side". The circumferential one side is a side that advances clockwise around the central axis J when viewed from the axial one side. The circumferential other side is a side that advances counterclockwise around the central axis J when viewed from axial one side.

First Embodiment

Figure 2:
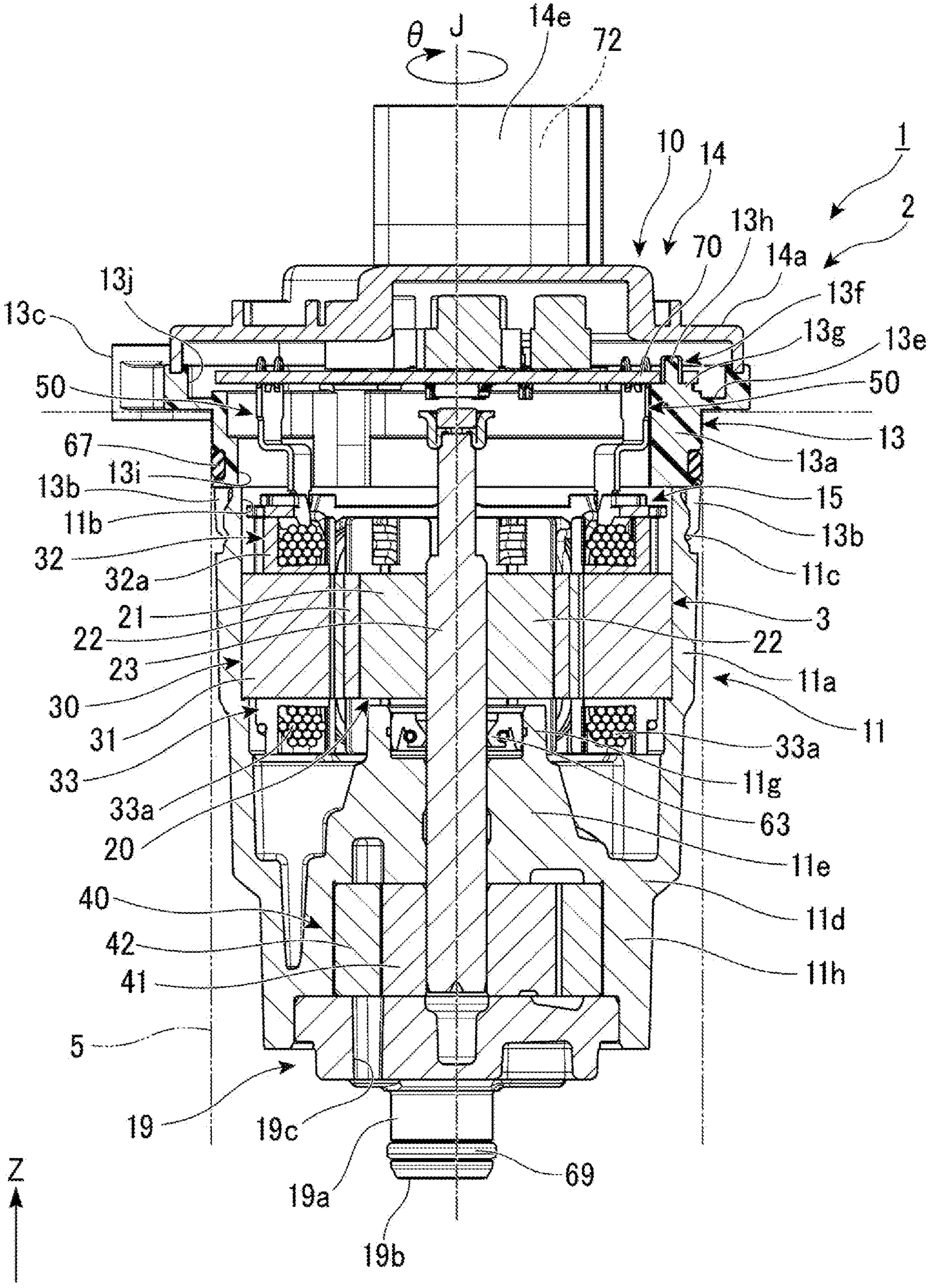
FIG. 2 is a cross-sectional view of the pump of the first embodiment.

A pump 1 of this embodiment shown in FIG. 1 is an electric pump installed on a device mounted on a vehicle. The device on which the pump 1 is mounted may be an automatic transmission or a drive device for driving the axle of the vehicle. As shown in FIG. 2, the device on which the pump 1 is mounted is called a mounted body 5. The pump 1 is, for example, an electric oil pump for supplying oil to device installed on a vehicle.

The pump 1 includes a motor 2 and a pump mechanism 40. The motor 2 includes a housing 10, a motor part 3, a circuit board 70, a terminal holder 15, connection terminals 50, and a sealer 63.

The housing 10 accommodates the motor part 3, the circuit board 70, the terminal holder 15, the connection terminals 50, the sealer 63, and the pump mechanism 40 inside. The housing 10 includes a motor housing 11, a board accommodator 13, a lid 14, and a pump cover 19. The motor housing 11, the board accommodator 13, the lid 14, and the pump cover 19 are separate members from each other. The board accommodator 13 is fixed to the upper side of the motor housing 11. The lid 14 is fixed to the upper side of the board accommodator 13. The pump cover 19 is fixed to the lower side of the motor housing 11.

The motor housing 11 has a substantially cylindrical shape that extends in the axial direction centered on the central axis J. The motor housing 11 accommodates the motor part 3, the terminal holder 15, the connection terminals 50, the sealer 63, and the pump mechanism 40 inside. The motor housing 11 has a peripheral wall 11*a*, a bottom 11*d*, a shaft supporter 11*e*, a sealer holder 11*g*, and a pump mechanism accommodator 11*h*.

The peripheral wall 11*a* surrounds the motor part 3, the terminal holder 15, the connection terminals 50, and the sealer 63 from the radially outer side. The peripheral wall 11*a* has a cylindrical shape that extends in the axial direction centered on the central axis J. The upper side end of the peripheral wall 11*a* is the upper side end of the motor housing 11. The peripheral wall 11*a* has a first opening 11*b* that is open at the upper side, and a fixed recess 11*c*. The fixed recess 11*c* is a groove recessed from the outer peripheral surface of the peripheral wall 11*a* toward the radially inner side. The fixed recess 11*c* is provided in the upper portion of the peripheral wall 11*a*. In this embodiment, the fixed recess 11*c* is provided all around the outer peripheral surface of the peripheral wall 11*a*.

The bottom 11*d* has a substantially annular shape centered on the central axis J. The radial outer edge of the surface facing the upper side of the bottom 11*d* is connected to the lower end of the peripheral wall 11*a* in the axial direction. The shaft supporter 11*e* is a substantially cylindrical shape that protrudes toward the upper side. The lower portion in the outer peripheral surface of the shaft supporter 11*e* is connected to the inner peripheral surface of the bottom 11*d* in the radial direction. The shaft supporter 11*e* is open at the upper side and the lower side. The sealer holder 11*g* protrudes toward the upper side from a surface facing the upper side of the shaft supporter 11*e*. The sealer holder 11*g* has a substantially cylindrical shape centered on the central axis J. The sealer 63 is held on the inner peripheral surface of the sealer holder 11*g*.

The pump mechanism accommodator 11*h* accommodates the pump mechanism 40 inside. The pump mechanism accommodator 11*h* protrudes from the bottom 11*d* toward the lower side. The pump mechanism accommodator 11*h* has a substantially cylindrical shape that is open at the lower side centered on the central axis J. The inside of the pump mechanism accommodator 11*h* is connected to the inside of the peripheral wall 11*a* through the inside of the shaft supporter 11*e*.

The pump cover 19 has a substantially disk shape centered on the central axis J. The pump cover 19 is arranged on the lower side of the pump mechanism 40. The pump cover 19 is fixed to a lower portion in an inner peripheral surface of the pump mechanism accommodator 11*h*. The pump cover 19 closes the opening of the pump mechanism accommodator 11*h* from the lower side. The pump cover 19 is provided with a sucker 19*a*, a suction port 19*b*, and a discharge port 19*c*.

The sucker 19*a* is a columnar shape that protrudes toward the lower side from the pump cover 19. A groove is provided in the outer peripheral surface of the sucker 19*a*, and an O-ring 69 is fitted in the groove. The suction port 19*b* is a hole that passes through the pump cover 19 and the sucker 19*a* in the axial direction. The discharge port 19*c* is a hole passing through the pump cover 19 in the axial direction. The suction port 19*b* and the discharge port 19*c* respectively connect the inside of the pump mechanism accommodator 11*h* and the outside of the pump 1. In this embodiment, oil is sucked into the pump mechanism accommodator 11*h* through the suction port 19*b*, and the oil is discharged to the outside of the pump 1 through the discharge port 19*c*.

The board accommodator 13 accommodates the circuit board 70 inside. The board accommodator 13 holds the circuit board 70. The board accommodator 13 is fixed to the upper end of the motor housing 11. The board accommodator 13 has a substantially annular shape centered on the central axis J. In this embodiment, the board accommodator 13 is made of resin. The board accommodator 13 has a board accommodating part 13*a*, a board holder 13*f*, a fixing claw 13*b*, and a flange 13*c*.

The board accommodating part 13*a* has a substantially annular shape centered on the central axis J. The board accommodating part 13*a* surrounds the circuit board 70 from the radially outer side. The board accommodating part 13*a* has a second opening 13*i* that is open at the lower side, and a third opening 13*j* that is open at the upper side. The inside of the motor housing 11 and the inside of the board accommodator 13 are connected through the first opening 11*b* and the second opening 13*i*. A step having a step surface 13*e* facing the upper side is provided on the inner side surface of the board accommodating part 13*a*. A groove is provided in the outer peripheral surface of the board accommodating part 13*a*, and an O-ring 67 is fitted in the groove.

Figure 3:
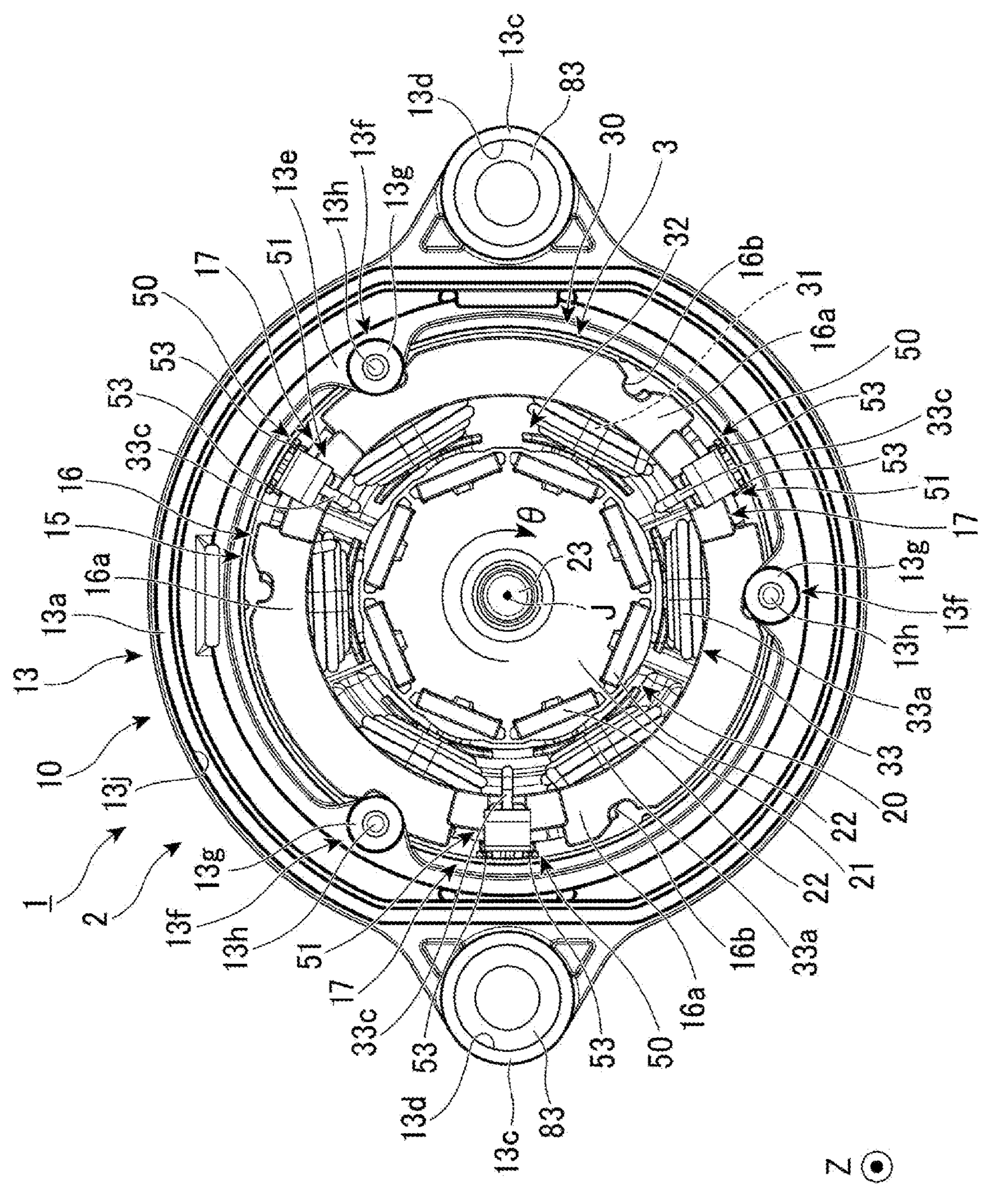
FIG. 3 is a top view showing a portion of the pump of the first embodiment.

The board holder 13*f* holds the circuit board 70. The board holder 13*f* protrudes toward the upper side from the step surface 13*e*. As shown in FIG. 3, in this embodiment, the board accommodator 13 has multiple board holders 13*f*. In this embodiment, the board accommodator 13 has three board holders 13*f*. The board holders 13*f* are arranged at substantially equal intervals along the circumferential direction. Each board holder 13*f* has a supporter 13*g* and an insertion part 13*h*. As shown in FIG. 2, the supporter 13*g* has a disk shape that protrudes toward the upper side from the step surface 13*e*. The plate surface of the supporter 13*g* faces the axial direction. The insertion part 13*h* has a columnar shape that protrudes toward the upper side from the supporter 13*g*. As shown in FIG. 3, the outer diameter of the insertion part 13*h* is smaller than the outer diameter of the supporter 13*g*.

Figure 4:
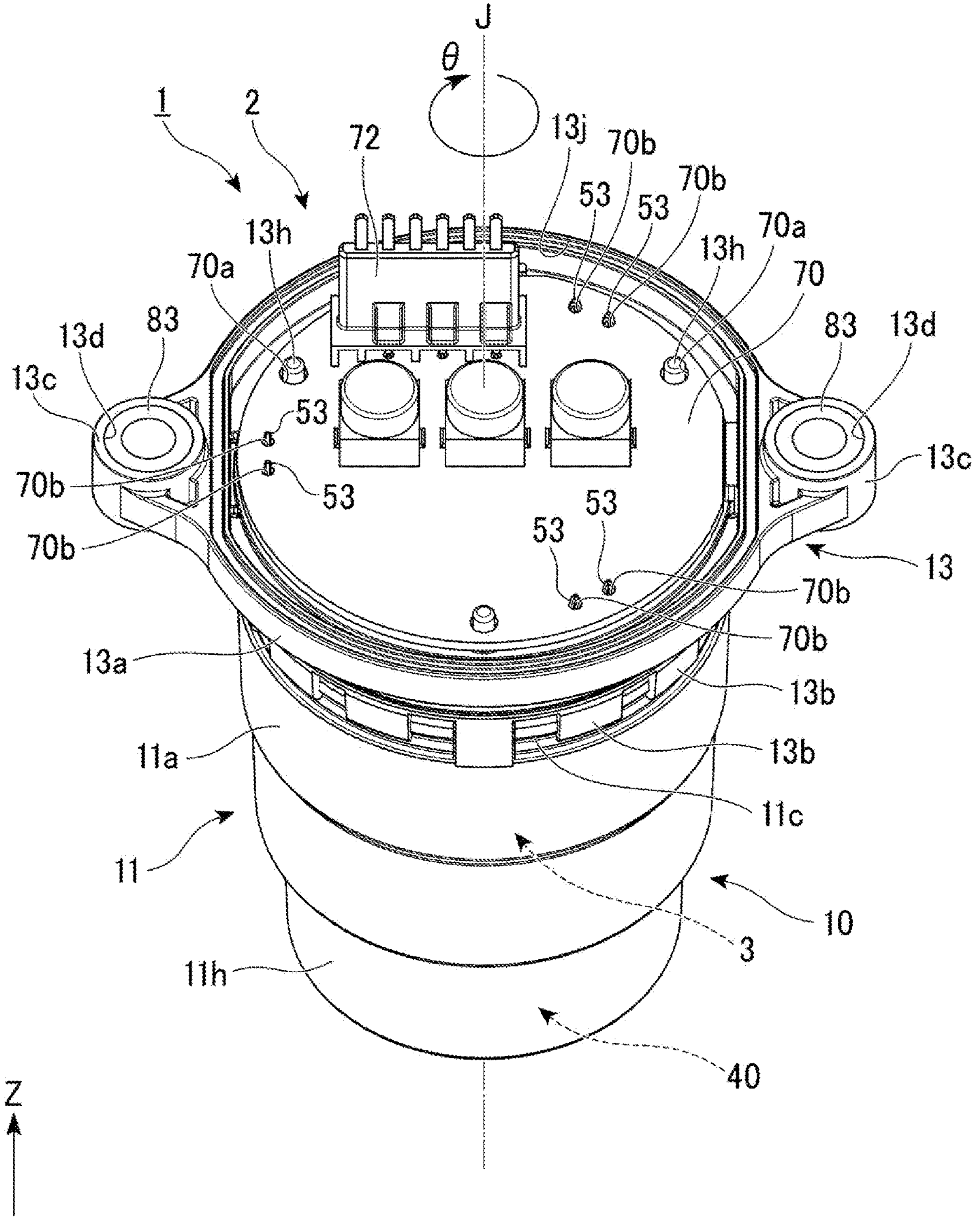
FIG. 4 is a first perspective view showing a portion of the pump of the first embodiment.

As shown in FIG. 2, the fixing claw 13*b* protrudes toward the lower side from the board accommodating part 13*a*. The fixing claw 13*b* is arranged further on the radially outer side than the peripheral wall 11*a*. The tip of the fixing claw 13*b* protrudes toward the radially inner side. In this embodiment, the board accommodator 13 has multiple fixing claws 13*b*. Although not shown, in this embodiment, the board accommodator 13 has fourteen fixing claws 13*b*. As shown in FIG. 4, the fixing claws 13*b* are arranged at intervals along the circumferential direction. As shown in FIG. 2, the tip of each fixing claw 13*b* is located inside the fixed recess 11*c* of the motor housing 11. Since each fixing claw 13*b* is elastically deformable toward the radially inner side, it is possible to prevent the tip of each fixing claw 13*b* from coming off from the inside of the fixed recess 11*c*. Thereby, the board accommodator 13 is fixed to the motor housing 11.

As shown in FIG. 4, the flange 13*c* protrudes toward the radially outer side from the board accommodating part 13*a*. When viewed in the axial direction, the flange 13*c* has a substantially triangular shape with one corner protruding toward the radially outer side. The flange 13*c* is provided with a flange hole 13*d* penetrating through the flange 13*c* in the axial direction. A collar 83 with a cylindrical shape that extends in the axial direction is fixed to the flange hole 13*d*. In this embodiment, the board accommodator 13 has multiple flanges 13*c*. In this embodiment, the board accommodator 13 has two flanges 13*c*. The flanges 13*c* are provided at positions facing each other in the radial direction. When a bolt (not shown) is passed through the inside of the collar 83 from the upper side and the bolt is tightened in a screw hole (not shown) provided in the mounted body 5, each flange 13*c* is fixed to the mounted body 5, as shown in FIG. 2. Thereby, the motor 2 and the pump 1 are fixed to the mounted body 5.

The lid 14 has a lid part 14*a* and a connector accommodator 14*e*. The lid part 14*a* has a substantially cylindrical shape that protrudes in the axial direction centered on the central axis J. The lid part 14*a* is open at the lower side. The lid part 14*a* is fixed to the upper end of the board accommodator 13. Thereby, the lid 14 is fixed to the board accommodator 13. The lid part 14*a* covers the third opening 13*j* from the upper side.

As shown in FIG. 1, the connector accommodator 14*e* protrudes toward the upper side from the lid part 14*a*. The connector accommodator 14*e* has a substantially square tubular shape that is open at both the upper side and the lower side. The inside of the connector accommodator 14*e* is connected to the inside of the lid 14 through a hole (not shown) that passes through the lid part 14*a* in the axial direction.

As shown in FIG. 2, the motor part 3 is accommodated inside the motor housing 11. In the axial direction, the motor part 3 is arranged below the circuit board 70 and above the pump mechanism 40. The motor part 3 has a rotor 20 and a stator 30.

The rotor 20 is rotatable about the central axis J. The rotor 20 includes a rotor core 21, a magnet 22, and a shaft 23. The magnet 22 and the shaft 23 are fixed to the rotor core 21. The rotor 20 is supported rotatably around the central axis J by an inner peripheral surface of the shaft supporter 11*e* supporting the shaft 23. The shaft 23 has a columnar shape that extends in the axial direction centered on the central axis J. The shaft 23 is passed through the inside of the shaft supporter 11*e* in the axial direction, and is arranged across the inside of the peripheral wall 11*a* and the inside of the pump mechanism accommodator 11*h*.

The stator 30 is arranged on the radially outer side of the rotor 20. The stator 30 faces the rotor 20 in the radial direction with a gap. The stator 30 has a stator core 31, an insulator 32, and a coil 33.

The stator core 31 is annular surrounding the rotor core 21 from the radially outer side. The outer peripheral surface of the stator core 31 is fixed to the peripheral wall 11*a* of the motor housing 11. In this embodiment, the stator core 31 is press-fitted into the peripheral wall 11*a*. The stator core 31 may be fixed to the peripheral wall 11*a* by other methods such as bonding.

Figure 5:
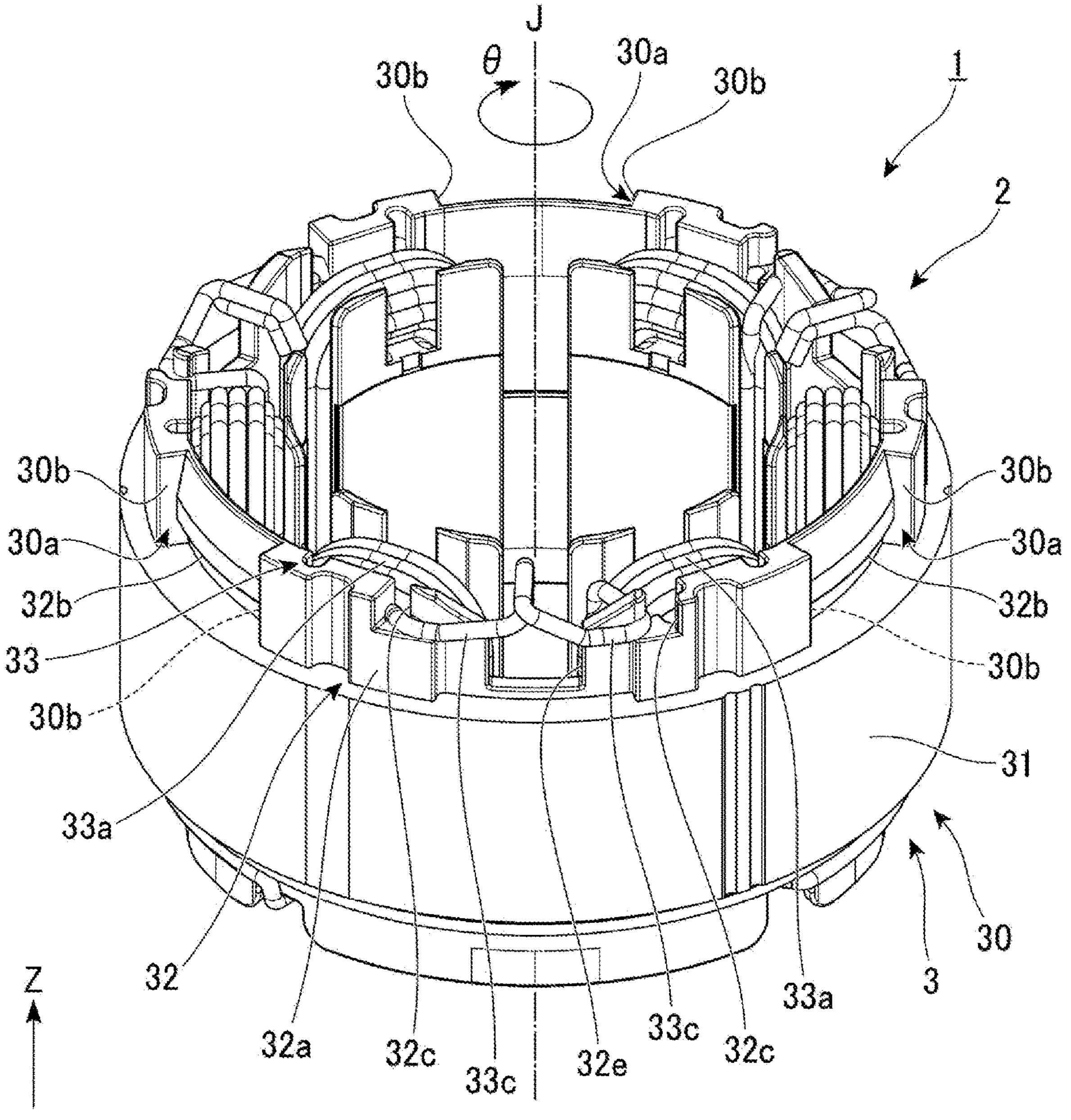
FIG. 5 is a second perspective view showing a portion of the pump of the first embodiment.

The insulator 32 is attached to the stator core 31. The insulator 32 is arranged between the stator core 31 and the coil 33. The insulator 32 insulates the stator core 31 and the coil 33. The insulator 32 has an annular wall 32*a* protruding toward the upper side. In the axial direction, the annular wall 32*a* is arranged between the stator core 31 and the circuit board 70. The annular wall 32*a* has a substantially annular shape centered on the central axis J. The annular wall 32*a* faces the peripheral wall 11*a* in the radial direction. The outer side surface of the annular wall 32*a* constitutes an upper portion in the outer side surface of the stator 30. That is, the outer side surface of the annular wall 32*a* is a portion of the outer side surface of the stator 30. As shown in FIG. 5, the annular wall 32*a* is provided with an insertion notch 32*c*, a recess 32*e*, and a mounting recess 30*a*.

The insertion notch 32*c* is a hole recessed from the upper end of the annular wall 32*a* toward the lower side. The insertion notch 32*c* is open at both sides in the radial direction. When viewed in the radial direction, the insertion notch 32*c* has a substantially rectangular shape. In this embodiment, multiple insertion notches 32*c* are provided in the annular wall 32*a*. Although not shown, in this embodiment, six insertion notches 32*c* are provided in the annular wall 32*a*. The insertion notches 32*c* are provided at intervals along the circumferential direction. In this embodiment, each pair of insertion notches 32*c* are arranged at substantially equal intervals along the circumferential direction. The two insertion notches 32*c* constituting the pair of insertion notches 32*c* are arranged at intervals along the circumferential direction.

The recess 32*e* is a hole recessed from a surface facing the upper side of the annular wall 32*a* toward the lower side. The recess 32*d* is open at both sides in the radial direction. When viewed in the radial direction, the recess 32*d* has a substantially rectangular shape. Although not shown, in this embodiment, three recesses 32*e* are provided in the annular wall 32*a*. The recesses 32*e* are provided at substantially equal intervals along the circumferential direction. In the circumferential direction, each recess 32*e* is provided between the pair of insertion notches 32*c*.

The mounting recess 30*a* is a hole recessed from the outer side surface of the annular wall 32*a* toward the radially inner side. That is, the mounting recess 30*a* is a hole recessed from the outer side surface of the stator 30 toward the radially inner side. The mounting recess 30*a* is open at both sides in the axial direction. The mounting recess 30*a* extends in the circumferential direction. When viewed in the radial direction, the mounting recess 30*a* has a substantially rectangular shape. The mounting recess 30*a* has two restriction surfaces 30*b*. One of the restriction surfaces 30*b* faces a circumferential one side (+θ side), and the other of the restriction surfaces 30*b* faces a circumferential other side (−θ side). In this embodiment, the restriction surface 30*b* has a planar shape. Moreover, the restriction surface 30*b* may be a tapered surface located on the circumferential one side or the circumferential other side as it goes toward the upper side, or may be curved.

Figure 6:
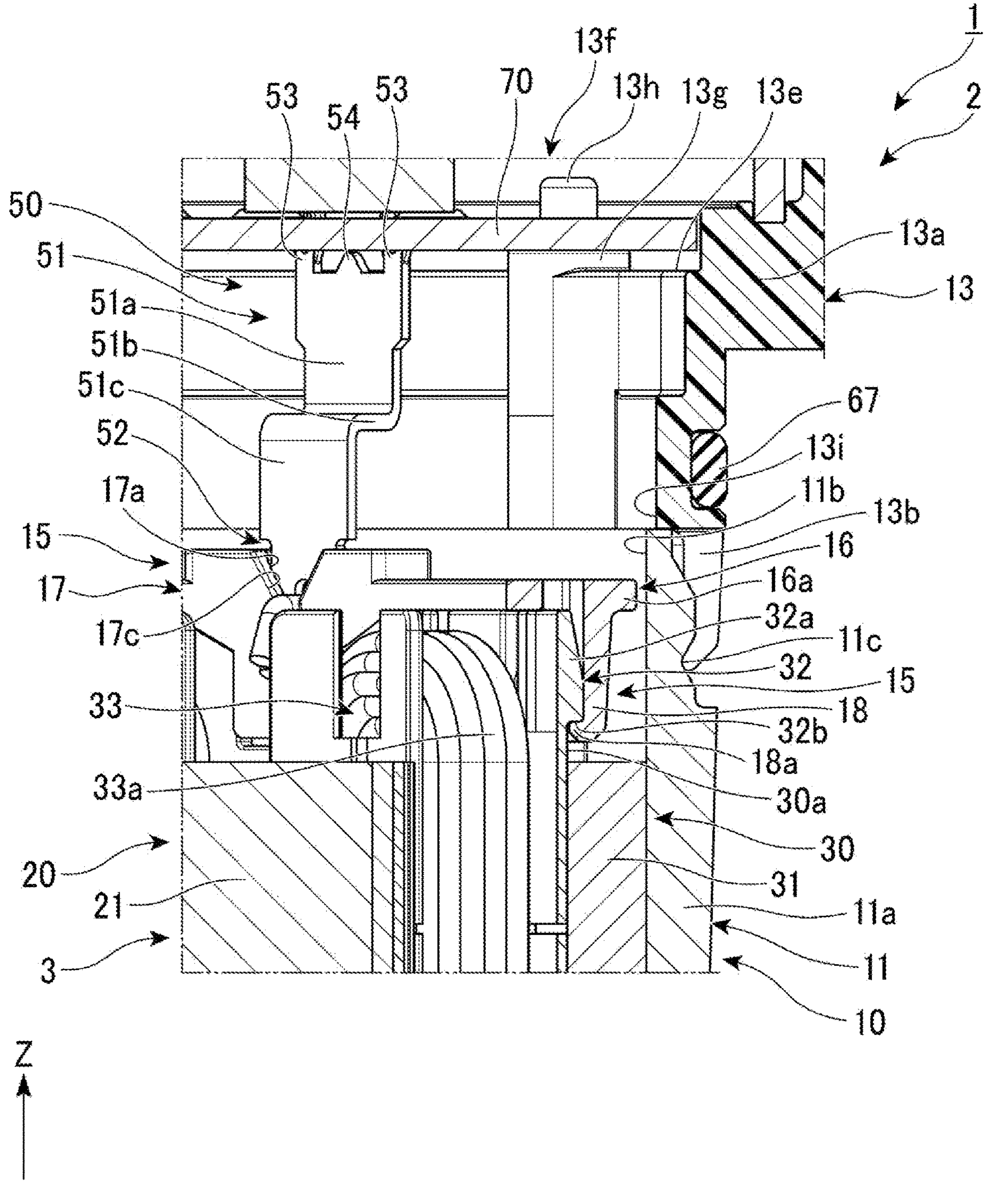
FIG. 6 is a cross-sectional view showing a portion of the pump of the first embodiment.

In this embodiment, multiple mounting recesses 30*a* are provided in the annular wall 32*a*. In this embodiment, three mounting recesses 30*a* are provided in the annular wall 32*a*. The mounting recesses 30*a* are arranged at substantially equal intervals in the circumferential direction. In the circumferential direction, each mounting recess 30*a* is provided between the pair of insertion notches 32*c* and the other pair of insertion notches 32*c*. As shown in FIG. 6, a support surface 32*b* facing the lower side, namely the axial other side, is provided on the outer side surface of the annular wall 32*a*. That is, the support surface 32*b* is provided on the outer side surface of the insulator 32. Although not shown, in this embodiment, three support surfaces 32*b* are provided on the annular wall 32*a*. Each support surface 32*b* is a surface facing the lower side in the inner side surface of a different mounting recess 30*a*.

The coil 33 is electrically connected to the circuit board 70 through the connection terminal 50. Power is supplied to the coil 33 from the circuit board 70 through the connection terminal 50. As shown in FIG. 2, the coil 33 has multiple coil bodies 33*a* and coil lead-out wires 33*c*.

The multiple coil bodies 33*a* are attached to the stator core 31. The multiple coil bodies 33*a* are arranged further on the radially inner side than the annular wall 32*a*. As shown in FIG. 3, in this embodiment, the coil 33 has six coil bodies 33*a*. The coil bodies 33*a* are arranged at intervals along the circumferential direction.

The coil lead-out wire 33*c* is connected to the connection terminal 50. As shown in FIG. 5, the coil lead-out wire 33*c* is led out from the coil body 33*a*. Although not shown, in this embodiment, the coil 33 has six coil lead-out wires 33*c*. Each coil lead-out wire 33*c* is led out from a different coil body 33*a*. Each coil lead-out wire 33*c* is led out from the coil body 33*a* to the radially outer side of the annular wall 32*a* via a different insertion notch 32*c*. The path where each coil lead-out wire 33*c* is arranged and the connection structure of each coil lead-out wire 33*c* and the connection terminals 50 will be described in detail latter.

As shown in FIG. 2, the sealer 63 is held on the inner peripheral surface of the sealer holder 11*g*. The sealer 63 is arranged on the lower side than the rotor core 21. In this embodiment, the sealer 63 is a lip seal having a lip on the radially inner side. The lip of the sealer 63 is brought into contact with the outer peripheral surface of the shaft 23. Thereby, the sealer 63 seals between the shaft 23 and the motor housing 11.

The pump mechanism 40 is accommodated inside the pump mechanism accommodator 11*h*. The pump mechanism 40 has an inner rotor 41 and an outer rotor 42. The inner rotor 41 is connected to a portion in the shaft 23 protruding into the pump mechanism accommodator 11*h*. Thereby, the pump mechanism 40 is connected to the rotor 20. The inner rotor 41 has an annular shape that surrounds the shaft 23. The outer rotor 42 has an annular shape that surrounds the inner rotor 41. The inner rotor 41 and the outer rotor 42 are engaged with each other. Thereby, when the rotor 20 rotates around the central axis J, the inner rotor 41 and the outer rotor 42 also rotate around the central axis J.

The circuit board 70 is electrically connected to the coil 33 through the connection terminal 50. The circuit board 70 controls power to be supplied to the coil 33. As described above, the circuit board 70 is accommodated inside the board accommodating part 13*a*. The circuit board 70 is arranged on the upper side, namely the axial one side, of the motor part 3. The circuit board 70 is arranged on the lower side of the lid 14. The circuit board 70 has a plate shape that spreads in a direction perpendicular to the axial direction. As shown in FIG. 4, when viewed in the axial direction, the circuit board 70 has a substantially circular shape. The circuit board 70 is provided with multiple first via holes 70*a* and multiple second via holes 70*b*. Moreover, a connector 72 is mounted on the circuit board 70.

Each of the multiple first via holes 70*a* is a hole that passes through the circuit board 70 in the axial direction. In this embodiment, three first via holes 70*a* are provided. The first via holes 70*a* are arranged at substantially equal intervals along the circumferential direction. The insertion part 13*h* of the board holder 13*f* is passed through each first via hole 70*a* in the axial direction. In this embodiment, the insertion part 13*h* is fitted into each first via hole 70*a*. Thereby, a circumferential position and a radial position of the circuit board 70 with respect to the board accommodator 13 are determined. Moreover, as shown in FIG. 2, a surface facing the lower side of the circuit board 70 is supported in the axial direction by the supporter 13*g* of the board holder 13*f*. Thereby, the axial position of the circuit board 70 with respect to the board accommodator 13 is determined. Thereby, the circuit board 70 is held in the board accommodator 13.

As shown in FIG. 4, the multiple second via holes 70*b* are holes passing through the circuit board 70 in the axial direction. The second via hole 70*b* is, for example, a through hole. A conductive copper foil is provided on the inner side surface of the second via hole 70*b*. In this embodiment, six second via holes 70*b* are provided. In this embodiment, each pair of the second via holes 70*b* is arranged at substantially equal intervals along the circumferential direction. The two second via holes 70*b* constituting a pair of the second via holes 70*b* are arranged at intervals in the circumferential direction.

The connector 72 electrically connects an external device (not shown) for supplying power to the motor 2 to the circuit board 70. The connector 72 is mounted on a surface facing the upper side of the circuit board 70 and protrudes toward the upper side. The upper portion of the connector 72 is arranged inside the connector accommodator 14*e* shown in FIG. 2.

Figure 7:
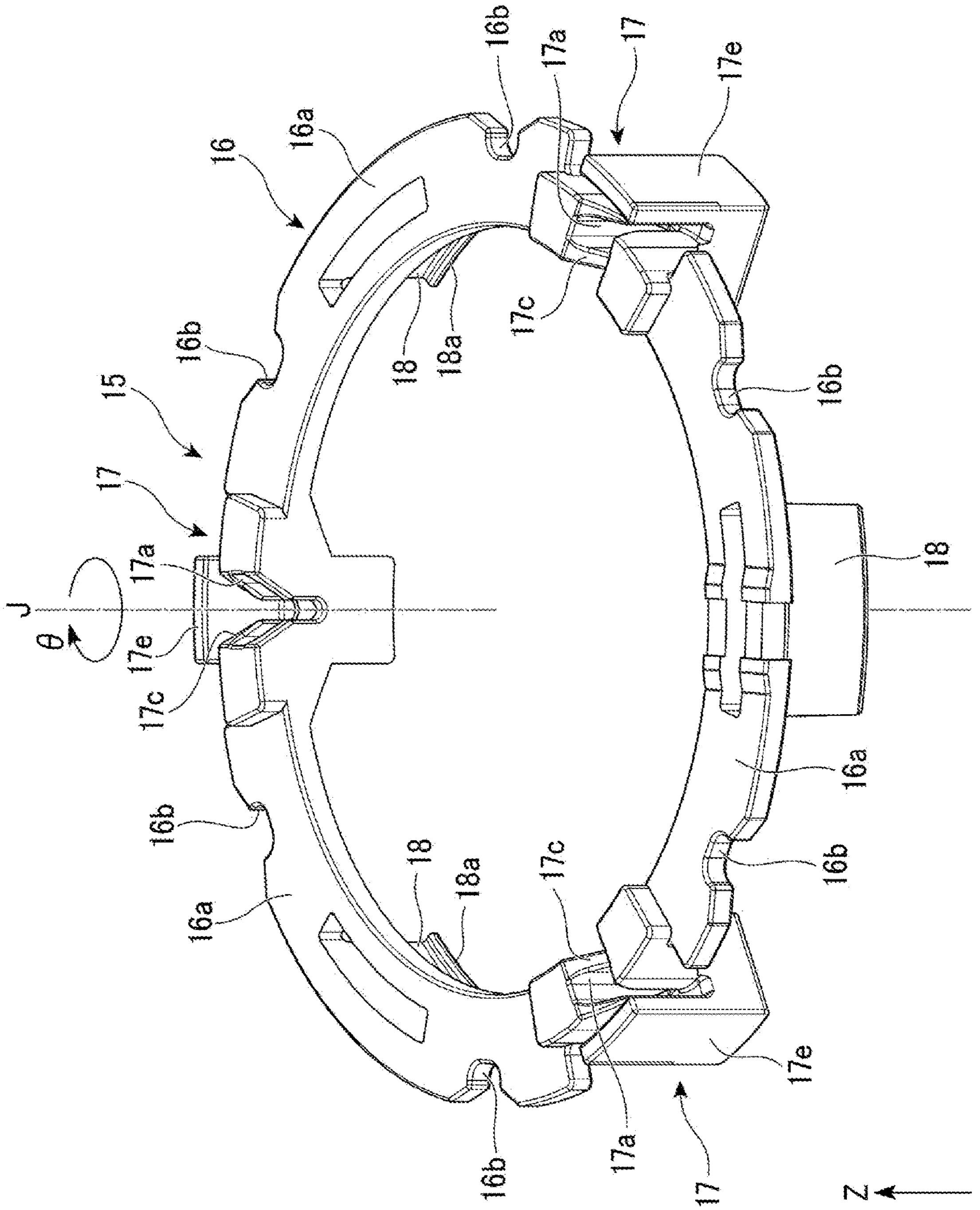
FIG. 7 is a perspective view showing a terminal holder of the first embodiment.

As shown in FIG. 2, the terminal holder 15 is accommodated inside the motor housing 11. In the axial direction, the terminal holder 15 is arranged between the stator core 31 and the circuit board 70. As shown in FIG. 3, the terminal holder 15 has a substantially annular shape that surrounds the central axis J. The terminal holder 15 holds the connection terminal 50. In this embodiment, the terminal holder 15 is mounted on the insulator 32. That is, the terminal holder 15 is mounted on the stator 30. As shown in FIG. 7, the terminal holder 15 has a body 16, a terminal holding part 17, and a claw 18.

Figure 8:
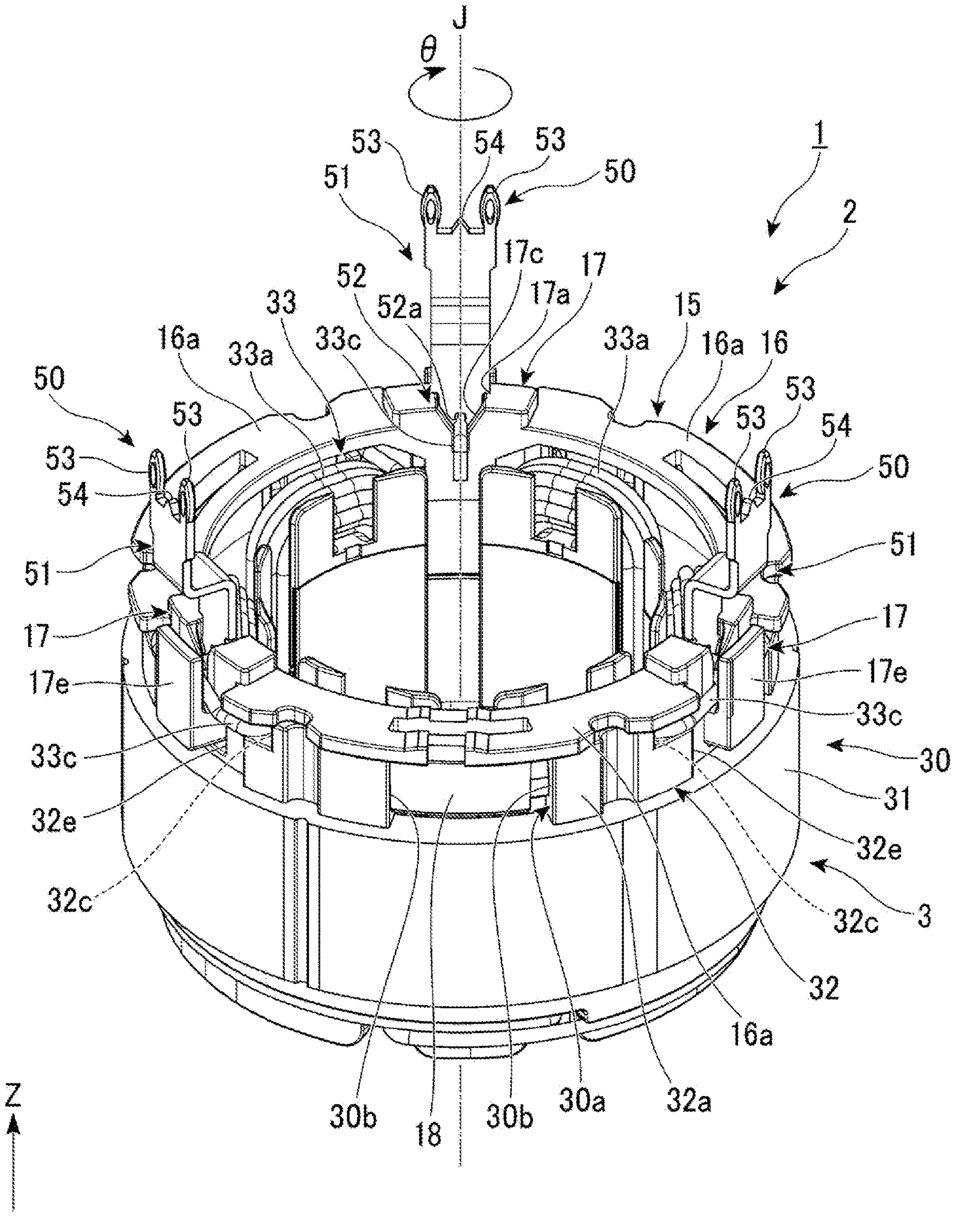
FIG. 8 is a third perspective view showing a portion of the pump of the first embodiment.

In this embodiment, the body 16 is a plate shape that extends in the circumferential direction. As shown in FIG. 8, the body 16 is arranged on the upper side, namely the axial one side, of the stator core 31. As shown in FIG. 7, in this embodiment, the body 16 is composed of three extension parts 16*a*. Each extension part 16*a* has a plate shape that extends in the circumferential direction centered on the central axis J. The plate surface of each extension part 16*a* faces the axial direction. When viewed in the axial direction, the outer side surfaces of each extension part 16*a* facing the radially outer side has an arc shape centered on the central axis J. When viewed in the axial direction, the inner side surface of each extension part 16*a* facing the radially inner side has an arc shape centered on the central axis J. When viewed in the axial direction, the angle defined by a straight line connecting the central axis J and the end of one extension part 16*a* on the circumferential one side (+θ side) and a straight line connecting the central axis J and the end of the extension part 16*a* on the circumferential other side (−θ side) is approximately 90°. The extension parts 16*a* are arranged at substantially equal intervals along the circumferential direction. Each extension part 16*a* has a notch 16*b* recessed in the radial direction.

In this embodiment, the notch 16*b* is recessed from the outer side surface of the extension part 16*a* toward the radially inner side. The notch 16*b* is open at the upper side and the lower side. In this embodiment, one extension part 16*a* is provided with two notches 16*b*. The two notches 16*b* provided in one extension part 16*a* are arranged at intervals along the circumferential direction. Moreover, each notch 16*b* may also be a hole recessed from the inner side surface of the extension part 16*a* toward the radially outer side.

The claw 18 has a plate shape that extends from the body 16 to the lower side, namely the axial other side. More specifically, the claw 18 extends from substantially the center in the circumferential direction of the extension part 16*a* to the lower side. As shown in FIG. 6, the claw 18 is arranged on the radially outer side of the annular wall 32*a* and on the radially inner side of the peripheral wall 11*a*. The plate surface of the claw 18 faces the radial direction. As shown in FIG. 7, in this embodiment, the terminal holder 15 has multiple claws 18. In this embodiment, the terminal holder 15 has three claws 18. The multiple claws 18 are arranged at substantially equal intervals along the circumferential direction.

As shown in FIG. 6, each claw 18 has a protrusion 18*a* that protrudes toward the radially inner side. The protrusion 18*a* protrudes toward the radially inner side from the lower edge of the claw 18. Each protrusion 18*a* is arranged inside a different mounting recess 30*a*. In this embodiment, each claw 18 is elastically deformable toward the radially outer side. Each support surface 32*b* comes into contact with the protrusion 18*a* in the axial direction and suppresses movement of the terminal holder 15 to the upper side. Moreover, the terminal holder 15 is supported on the upper surface of the insulator 32, and the movement toward the lower side is suppressed. Thereby, the terminal holder 15 is mounted on the stator 30.

Although not shown, in this embodiment, the circumferential dimension of each protrusion 18*a* of each claw 18 is the same as the circumferential dimension of each claw 18. As shown in FIG. 8, the circumferential dimension of each claw 18 is smaller than the circumferential dimension of the mounting recess 30*a*. That is, the circumferential dimension of each protrusion 18*a* is smaller than the circumferential dimension of the mounting recess 30*a*. Therefore, each pf the protrusions 18*a* is able to move in the circumferential direction inside the mounting recess 30*a*. Thereby, the terminal holder 15 is able to move in the circumferential direction with respect to the stator 30. When viewed in the circumferential direction, each protrusion 18*a* overlaps the restriction surface 30*b* of the mounting recess 30*a*. Therefore, when the terminal holder 15 is moved to the circumferential one side (+θ side) with respect to the stator 30, the end of the protrusion 18*a* on the circumferential one side comes into contact with the restriction surface 30*b* that faces the circumferential other side (−θ side). Conversely, when the terminal holder 15 is moved to the circumferential other side with respect to the stator 30, the end of the protrusion 18*a* on the circumferential other side comes into contact with the restriction surface 30*b* that faces the circumferential one side. Thereby, it is possible to regulate the moving distance of the terminal holder 15 in the circumferential direction with respect to the stator 30.

As shown in FIG. 7, the t terminal holding part 17 has a substantially rectangular parallelepiped shape that extends in the axial direction. The two outer side surfaces of the terminal holding part 17 face the radial direction. In this embodiment, the terminal holder 15 has multiple terminal holding parts 17. In this embodiment, the terminal holder 15 has three terminal holding parts 17. As shown in FIG. 8, each terminal holding part 17 holds the connection terminal 50. That is, the terminal holder 15 holds multiple connection terminals 50. In this embodiment, the terminal holder 15 holds three connection terminals 50. As shown in FIG. 7, the terminal holding parts 17 are arranged at substantially equal intervals along the circumferential direction. Each terminal holding part 17 is arranged between the extension parts 16*a* arranged adjacent to each other in the circumferential direction. The upper portion of each terminal holding part 17 is connected in the circumferential direction to each extension part 16*a* arranged adjacent to each other in the circumferential direction. The lower end of each terminal holding part 17 is located below the lower end of the body 16. As shown in FIG. 8, the lower portion of each terminal holding part 17 is arranged inside the recess 32*e* of the annular wall 32*a*. Each terminal holding part 17 is arranged between the coil bodies 33*a* adjacent to each other in the circumferential direction.

Thus, according to this embodiment, compared with a case where the terminal holding part 17 is arranged on the upper side of the coil body 33*a*, it is possible to suppress the terminal holder 15 from increasing in size in the axial direction. As a result, it is possible to suppress the motor 2 and the pump 1 from increasing in size in the axial direction. Moreover, compared with the case where the terminal holding part 17 is arranged further on the radially outer side than the coil body 33*a*, it is possible to suppress the terminal holder 15 from increasing in size in the radial direction. As a result, it is possible to prevent the motor 2 and the pump 1 from increasing in size in the radial direction.

Figure 9:
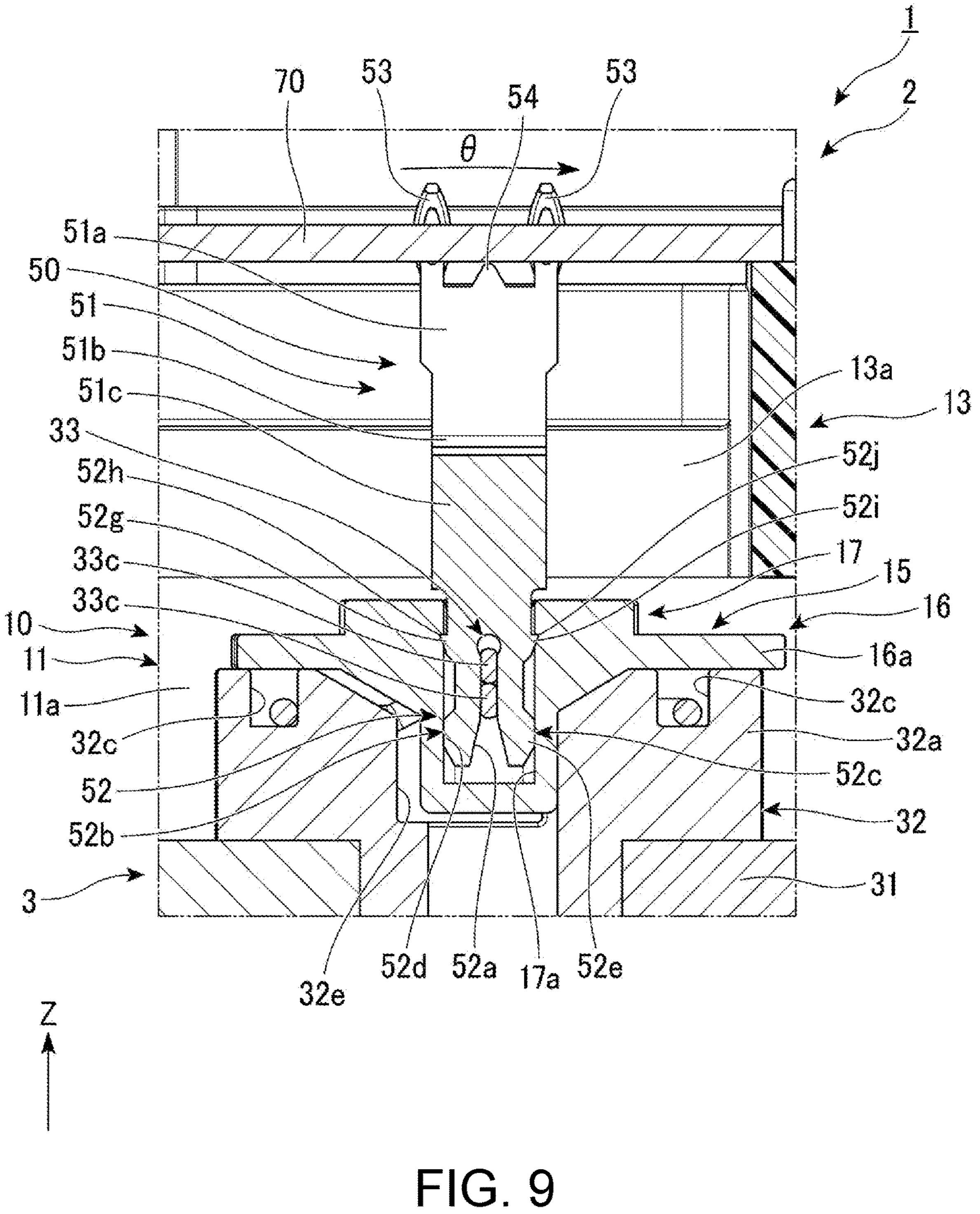
FIG. 9 is a second cross-sectional view showing a portion of the pump of the first embodiment.
Figure 10:
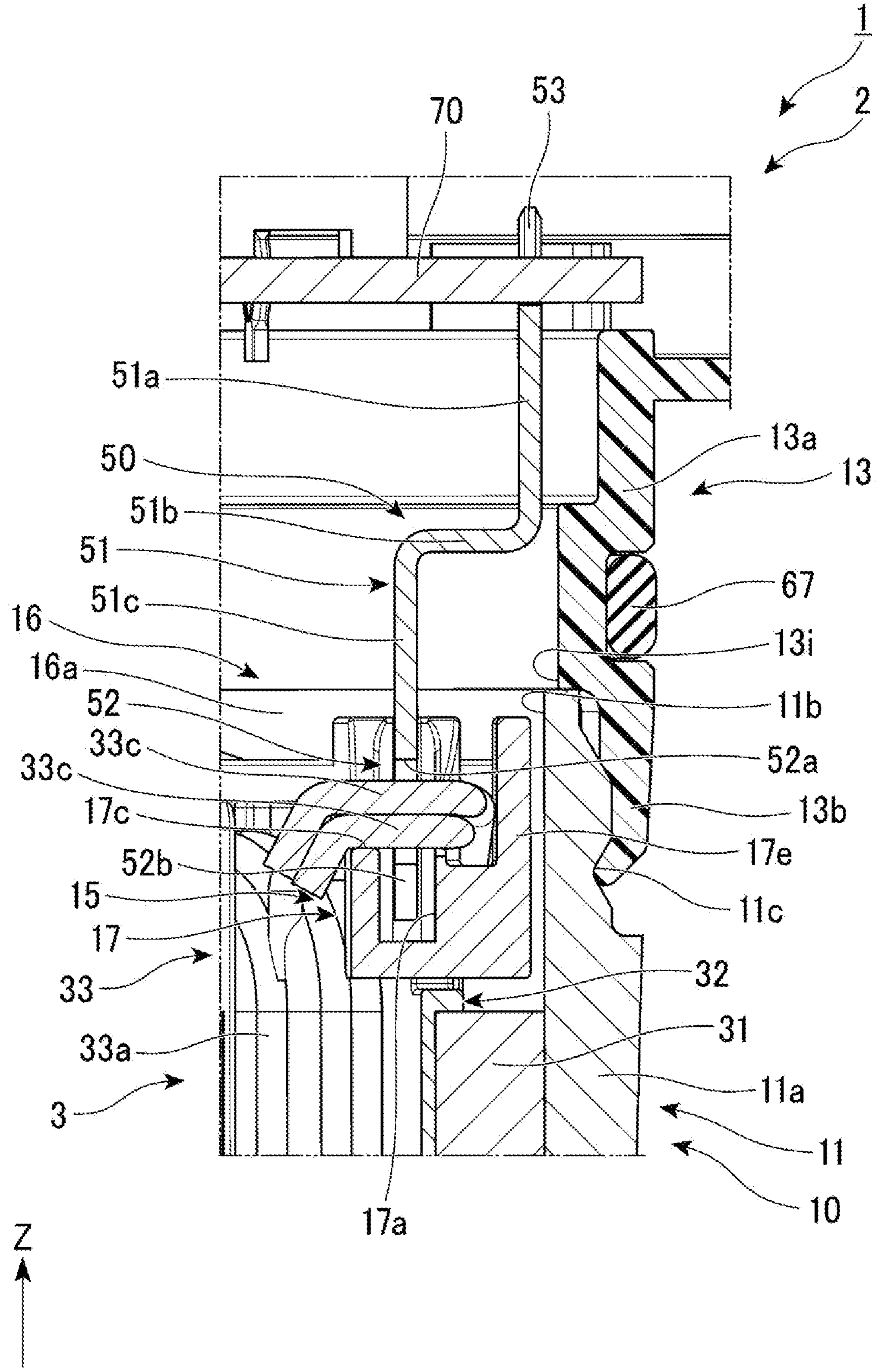
FIG. 10 is a third cross-sectional view showing a portion of the pump of the first embodiment.

As shown in FIG. 7, each terminal holding part 17 has a holding hole 17*a* and a groove 17*c*. Each terminal holding part 17 is provided with an outer wall 17*e*. The holding hole 17*a* is a hole recessed from the upper side of the terminal holding part 17, namely the surface facing axial one side, toward the lower side, namely the axial other side. Although not shown, when viewed in the axial direction, the holding hole 17*a* has a substantially rectangular shape with the long side extending in the circumferential direction. As shown in FIG. 9, when viewed in the radial direction, the holding hole 17*a* has a substantially rectangular shape. As shown in FIG. 10, when viewed in the circumferential direction, the holding hole 17*a* has a substantially rectangular shape.

As shown in FIG. 7, the groove 17*c* is a hole recessed from the upper side, namely the axial one side, of the terminal holding part 17 toward the lower side, namely the axial other side. The groove 17*c* is open at the radially inner side and the radially outer side. The groove 17*c* traverses the holding hole 17*a* in the radial direction. The inside of the groove 17*c* is connected to the inside of the holding hole 17*a*. When viewed in the radial direction, the shape of the groove 17*c* is line-symmetric with a virtual line (not shown) passing through the circumferential center of the terminal holding part 17 as a symmetric axis. When viewed in the radial direction, the width of the upper portion of the groove 17*c* in the circumferential direction decreases from the upper side toward the lower side. When viewed in the radial direction, the lower portion of the groove 17*c* in the radial direction has a long hole shape that extends from the upper side to the lower side with approximately the same circumferential dimension. When viewed in the radial direction, the lower end of the groove 17*c* has a semicircular shape that protrudes toward the lower side.

The outer wall 17*e* has a plate shape that extends in a direction perpendicular to the radial direction. When viewed in the radial direction, the outer wall 17*e* has a substantially rectangular shape with the long side extending in the axial direction. The outer wall 17*e* is arranged at a radial distance from the terminal holding part 17. When viewed in the radial direction, the circumferential center side of the outer wall 17*e* overlaps the groove 17*c*. The portions on the circumferential two sides of the outer wall 17*e* face the surface of the terminal holding part 17 facing the radially outer side. The lower edge of the outer wall 17*e* protrudes toward the radially inner side and is connected to the lower edge of the terminal holding part 17.

Figure 11:
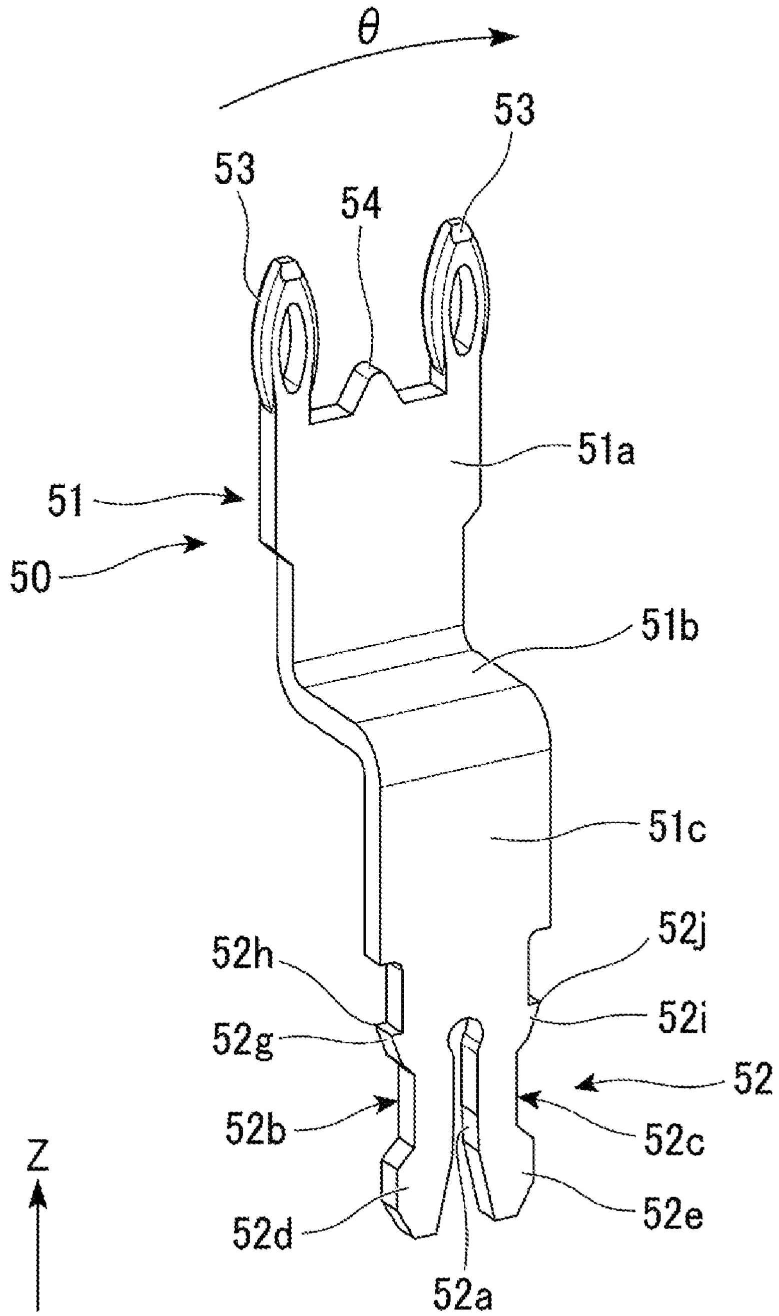
FIG. 11 is a perspective view showing a connection terminal of the first embodiment.

The connection terminal 50 electrically connects the coil 33 and the circuit board 70. As shown in FIG. 2, the connection terminal 50 is arranged between the stator 30 and the circuit board 70 in the axial direction. As shown in FIG. 8, the connection terminal 50 is held by the terminal holding part 17 of the terminal holder 15. In this embodiment, the motor part 3 has the multiple connection terminals 50. In this embodiment, the motor part 3 has three connection terminals 50. The connection terminals 50 are arranged at substantially equal intervals along the circumferential direction. The connection terminal 50 has conductivity. In this embodiment, the connection terminal 50 is made of metal. As shown in FIG. 11, the connection terminal 50 includes a terminal body 51, a connection part 52, a board connection part 53, and a board supporter 54.

The terminal body 51 extends in the axial direction. The terminal body 51 has a first terminal body 51*a*, a second terminal body 51*b*, and a third terminal body 51*c*. The first terminal body 51*a* has a plate shape that extends in the axial direction. The plate surface of the first terminal body 51*a* faces the radial direction. When viewed in the radial direction, the first terminal body 51*a* has a substantially rectangular shape. As shown in FIG. 10, the first terminal body 51*a* is arranged between the circuit board 70 and the terminal holder 15 in the axial direction. The upper end of the first terminal body 51*a* is the upper end of the terminal body 51. The second terminal body 51*b* has a plate shape that extends to the radially inner side from the lower end of the first terminal body 51*a*. The plate surface of the second terminal body 51*b* faces the axial direction. As shown in FIG. 11, when viewed in the axial direction, the second terminal body 51*b* has a substantially rectangular shape. The third terminal body 51*c* has a plate shape that protrudes toward the lower side from an end on the radially inner side of the second terminal body 51*b*. The plate surface of the third terminal body 51*c* faces the radial direction. When viewed in the radial direction, the third terminal body 51*c* has a substantially rectangular shape. As shown in FIG. 9, the third terminal body 51*c* is arranged above the terminal holding part 17. The lower end of the third terminal body 51*c* is the lower end of the terminal body 51.

The connection part 52 has a plate shape that extends from the lower end of the third terminal body 51*c* to the lower side. That is, the connection part 52 extends from the terminal body 51 to the lower side, namely the axial other side. The plate surface of the connection part 52 faces the radial direction. When viewed in the radial direction, the connection part 52 has a substantially rectangular shape with the long side extending in the axial direction. The connection part 52 is arranged inside the holding hole 17*a* of the terminal holding part 17. As shown in FIG. 10, the radial dimension of the connection part 52 is smaller than the radial dimension of the holding hole 17*a*. That is, the radial dimension of the holding hole 17*a* is larger than the radial dimension of the connection part 52. As shown in FIG. 11, the connection part 52 has a press-contact part 52*a*, a first part 52*b*, a second part 52*c*, first press-fit parts 52*d* and 52*e*, and second press-fit parts 52*g* and 52*i*.

The press-contact part 52*a* is a hole recessed from the lower side of the connection part 52, namely the axial other side, toward the upper side, namely the axial one side. The press-contact part 52*a* is open at the radially inner side and at the radially outer side, namely on both sides in the radial direction. As shown in FIG. 9, when viewed in the radial direction, the shape of the press-contact part 52*a* is line-symmetric with a virtual line (not shown) passing through the circumferential center of the connection part 52 as a symmetric axis. When viewed in the radial direction, the circumferential dimension of the lower portion of the press-contact part 52*a* decreases from the lower side toward the upper side. When viewed in the radial direction, the upper portion of the press-contact part 52*a* has a long hole shape that extends from the lower side to the upper side with approximately the same circumferential dimension. When viewed in the radial direction, the upper end of the press-contact part 52*a* has a semicircular shape that protrudes toward the upper side. As shown in FIG. 8, when viewed in the radial direction, the press-contact part 52*a* overlaps the groove 17*c*. Thus, a space on the radially outer side of the terminal holding part 17 and a space on the radially inner side of the terminal holding part 17 are connected via the press-contact part 52*a* and the groove 17*c*.

Figure 12:
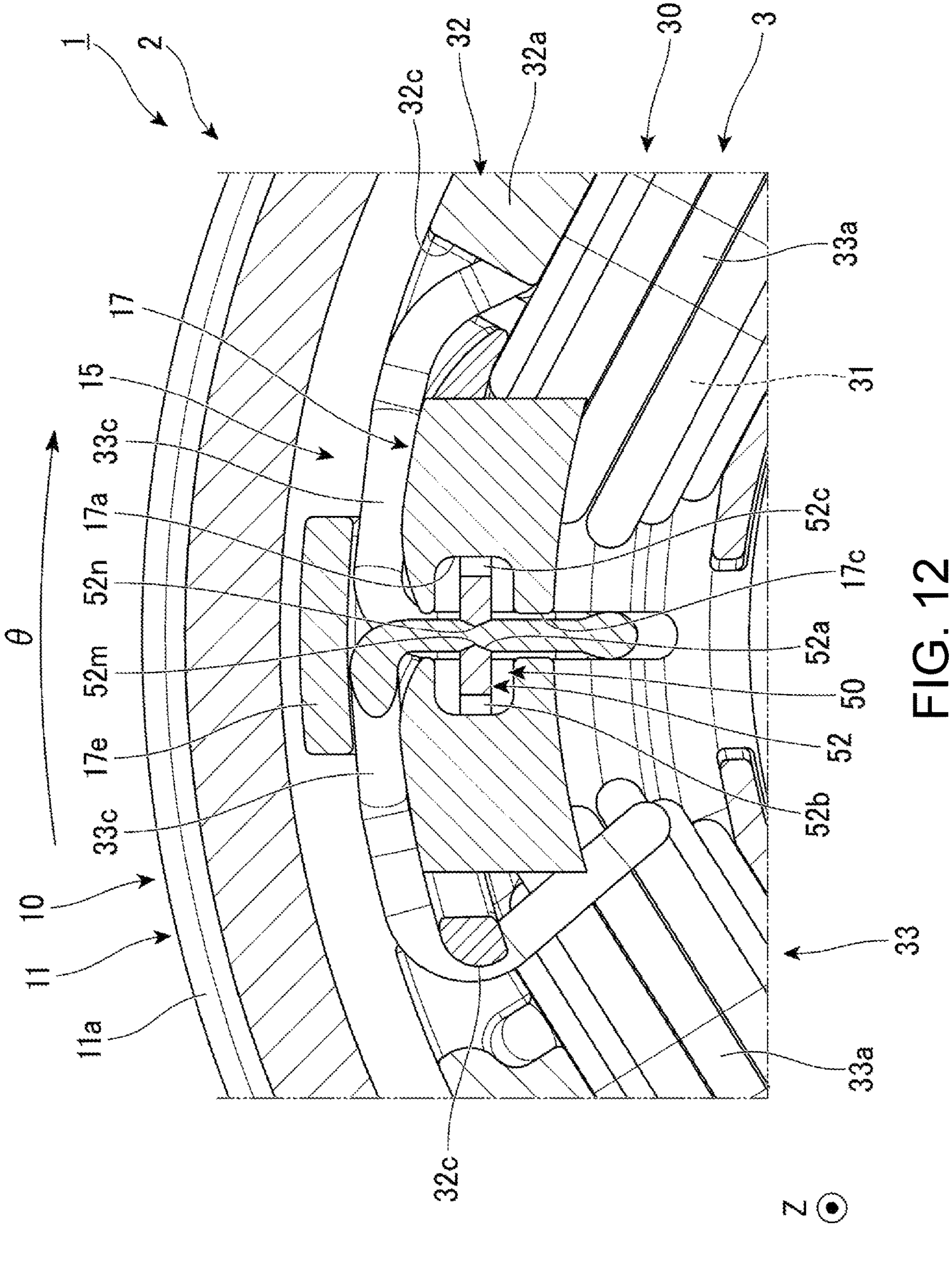
FIG. 12 is a fourth cross-sectional view showing a portion of the pump of the first embodiment.

As shown in FIG. 12, when viewed in the axial direction, the surface of the press-contact part 52*a* facing the circumferential one side (+θ side) is located on the circumferential one side as it goes from the two ends in the radial direction toward the center in the radial direction, and a corner 52*m* is defined at an end on the circumferential one side. When viewed in the axial direction, the corner 52*m* has a sharp shape toward the circumferential one side. When viewed in the axial direction, the surface of the press-contact part 52*a* facing the circumferential other side (−θ side) is located on the circumferential other side as it goes from the two ends in the radial direction toward the center in the radial direction, and a corner 52*n* is defined at an end on the circumferential other side. When viewed in the axial direction, the corner 52*n* has a sharp shape toward the circumferential other side. The corners 52*m* and 52*n* face each other in the circumferential direction.

As shown in FIG. 11, the first part 52*b* is a portion in the connection part 52 further on the circumferential other side (−θ side) than the press-contact part 52*a*. The second part 52*c* is a portion in the connection part 52 further on the circumferential one side (+θ side) than the press-contact part 52*a*. The first part 52*b* and the second part 52*c* extend in the axial direction.

The first press-fit part 52*d* protrudes from a lower portion of the first part 52*b* to the circumferential other side (−θ side). The first press-fit part 52*e* protrudes from a lower portion of the second part 52*c* to the circumferential one side (+θ side). The dimension between the end of the first press-fit part 52*d* on the circumferential other side and the end of the first press-fit part 52*e* on the circumferential one side is smaller than the circumferential dimension of the holding hole 17*a* shown in FIG. 9. Thus, when the connection part 52 is inserted into the holding hole 17*a*, the first press-fit parts 52*d* and 52*e* are press-fitted into the holding hole 17*a*. Thereby, the connection part 52 is held in the holding hole 17*a*. Moreover, when the connection part 52 is inserted into the holding hole 17*a*, the first part 52*b* is elastically deformed to the circumferential one side, and the second part 52*c* is elastically deformed to the circumferential other side.

As shown in FIG. 11, the second press-fit part 52*g* protrudes from the upper edge of the first part 52*b* to the circumferential other side (−θ side). When viewed in the radial direction, the surface of the second press-fit part 52*g* facing the lower side is a tapered surface located on the upper side as it goes toward the circumferential other side. The surface facing the upper side of the second press-fit part 52*g* has a planar shape that faces the upper side. The end of the circumferential other side of the surface facing the upper side of the second press-fit part 52*g* is connected to the end of the circumferential other side of the surface facing the lower side of the second press-fit part 52*g*. The end of the second press-fit part 52*g* on the circumferential other side constitutes an edge 52*h* that is sharp toward the circumferential other side. The second press-fit part 52*i* protrudes from an upper edge of the second part 52*c* to the circumferential one side (+θ side). When viewed in the radial direction, the surface facing the lower side of the second press-fit part 52*i* is a tapered surface located on the upper side as it goes toward the circumferential one side. The surface facing the upper side of the second press-fit part 52*i* has a planar shape that faces the upper side. The end of the circumferential one side of the surface facing the upper side of the second press-fit part 52*i* is connected to the end of the circumferential one side of the surface facing the lower side of the second press-fit part 52*i*. The end of the second press-fit part 52*i* on the circumferential one side constitutes an edge 52*j* that is sharp toward the circumferential one side. The dimension between the edge 52*h* and the edge 52*j* is smaller than the circumferential dimension of the holding hole 17*a* shown in FIG. 9. As a result, when the connection part 52 is inserted into the holding hole 17*a*, the second press-fit parts 52*g* and 52*i* are press-fitted into the holding hole 17*a*. Moreover, when the connection terminal 50 is about to move toward the upper side with respect to the terminal holding part 17, the edges 52*h* and 52*j* are caught by the inner side surface of the holding hole 17*a*, so it is possible to suppress the movement of the connection terminal 50 toward the upper side with respect to the terminal holding part 17. Thus, it is possible to determine the axial position of the connection terminal 50 to the terminal holder 15 accurately.

As shown in FIG. 11, the board connection part 53 has a plate shape that protrudes from the terminal body 51 toward the upper side, namely the axial one side. The plate surface of the board connection part 53 faces the radial direction. When viewed in the radial direction, the board connection part 53 has a substantially elliptical shape with the major axis extending in the axial direction. The board connection part 53 is provided with a hole penetrating through the board connection part 53 in the radial direction. When viewed in the radial direction, the hole has a substantially elliptical shape with the major axis extending in the axial direction. Since a hole is provided in the board connection part 53, the board connection part 53 is elastically deformable in the circumferential direction. Since a hole is provided in the board connection part 53, the board connection part 53 is elastically deformable in a direction crossing the axial direction. In this embodiment, the connection terminal 50 has two board connection parts 53. One board connection part 53 protrudes toward the upper side from an edge on the circumferential other side (−θ side) of the terminal body 51. The other board connection part 53 protrudes toward the upper side from the circumferential one side (+θ side) of the terminal body 51. The two board connection parts 53 are arranged at intervals along the circumferential direction.

As shown in FIG. 4, the board connection part 53 of each connection terminal 50 is passed through the second via hole 70*b* of the circuit board 70 in the axial direction. Each board connection part 53 is press-fitted into the second via hole 70*b*. As described above, since the board connection part 53 is elastically deformable in the circumferential direction, each board connection part 53 is fixed to the second via hole 70*b* by the restoring force of the board connection part 53. Thereby, each board connection part 53 is connected to the circuit board 70. Since the board connection part 53 is connected to the circuit board 70, the board connection part 53 and the circuit board 70 are electrically connected. Thus, according to this embodiment, in the process of connecting the connection terminal 50 and the circuit board 70, it is possible to connect each board connection part 53 to the second via hole 70*b* of the circuit board 70 by a simple work of moving the circuit board 70 toward the lower side from the upper side of the connection terminal 50 held by the terminal holder 15 beforehand. As a result, since the connection terminal 50 and the circuit board 70 are able to be connected easily, it is possible to suppress an increase of assembling man-hours of the motor 2 and the pump 1.

As shown in FIG. 11, the board supporter 54 protrudes toward the upper side from the terminal body 51. The board supporter 54 is arranged between two board connection parts 53. When viewed in the radial direction, the board supporter 54 has a substantially triangular shape that protrudes toward the upper side. The upper side end of the board supporter 54 is located below the upper end of the board connection part 53. As shown in FIG. 9, the board supporter 54 contacts a surface facing the lower side of the circuit board 70 in the axial direction. Thereby, the board supporter 54 supports the circuit board 70 in the axial direction. As a result, it is possible to enhance the positional accuracy of the circuit board 70 in the axial direction with respect to the terminal holder 15 by the connection terminal 50.

As shown in FIG. 12, in this embodiment, two coil lead-out wires 33*c* are connected to the connection part 52 of each connection terminal 50. Each two coil lead-out wire 33*c* is led out from each of a pair of the coil bodies 33*a* arranged to sandwich each terminal holding part 17 in the circumferential direction.

As described above, the coil lead-out wire 33*c* is led out from the coil body 33*a* to the radially outer side of the annular wall 32*a* via a different insertion notch 32*c*. One coil lead-out wire 33*c*, which is led out to the radially outer side of the annular wall 32*a* from the coil body 33*a* arranged on the circumferential one side (+θ side) of the terminal holding part 17, is led out toward the circumferential other side (−θ side) toward the terminal holding part 17, passed through the gap between the terminal holding part 17 and the outer wall 17*e* toward the circumferential outer side, then bent toward the radially inner side, and passed in the radial direction through the inside of the groove 17*c* of the terminal holding part 17 and the inside of the press-contact part 52*a* of the connection terminal 50. The other coil lead-out wire 33*c*, which is led out from the coil body 33*a* arranged on the circumferential other side of the terminal holding part 17, is led out toward the circumferential one side toward the terminal holding part 17, passed through the gap between the terminal holding part 17 and the outer wall 17*e* toward the circumferential one side, then bent toward the radially inner side, and passed in the radial direction through the inside of the groove 17*c* and the inside of the press-contact part 52*a*.

In this embodiment, the dimension of the gap between the corners 52*m* and 52*n* of the press-contact part 52*a* is smaller than the diameter of the coil lead-out wire 33*c*. Moreover, as described above, the first press-fit parts 52*d* and 52*e* and the second press-fit parts 52*g* and 52*i* of the connection part 52 are press-fitted to the inner side surface of the holding hole 17*a* in the radial direction, respectively. Thus, two coil lead-out wires 33*c* are press-fitted into the press-contact part 52*a* of the connection part 52, and thereby the coil lead-out wires 33*c* and the connection part 52 are connected. That is, the connection part 52 is connected to the coil 33. That is, the connection terminal 50 and the coil 33 are connected. Moreover, as described above, the circuit board 70 is connected to the board connection part 53 of the connection terminal 50. Thereby, the connection terminal 50 electrically connects the coil 33 and the circuit board 70. Moreover, in this embodiment, even if each connection terminal 50 is arranged displaced with respect to the stator 30 in the circumferential direction, by adjusting the length of the coil lead-out wire 33*c* between the coil body 33*a* and the connection terminals 50 as appropriate, it is possible to easily connect the coil lead-out wire 33*c* to the connection terminals 50.

According to the motor 2 according to this embodiment, the stator 30 includes the annular stator core 31, the coil 33 having the multiple coil bodies 33*a* attached to the stator core 31, and the insulator 32 arranged between the stator core 31 and the coil 33. The connection terminal 50 electrically connects the coil 33 and the circuit board 70, and the motor 2 includes the terminal holder 15 that holds the connection terminal 50 and is mounted on the stator 30 and movable in the circumferential direction. In a configuration in which the connection terminal 50 connecting the coil 33 and the circuit board 70 is held by, for example, the insulator 32 of the stator 30, when the stator 30 is fixed to the motor housing 11 with its circumferential position displaced with respect to the motor housing 11, the circumferential position of the connection terminal 50 with respect to the circuit board 70 is displaced. Therefore, in a process of connecting the connection terminal 50 and the circuit board 70, there is a possibility that the connection between the connection terminal 50 and the circuit board 70 becomes difficult. On the other hand, in this embodiment, the connection terminal 50 is held by the terminal holder 15 moveable in the circumferential direction with respect to the stator 30, and so the circumferential position of the connection terminal 50 with respect to the circuit board 70 is able to be adjusted. Thus, it is possible to simplify the work of connecting the connection terminal 50 to the circuit board 70. Moreover, the work of connecting the connection terminal 50 to the circuit board 70 is facilitated, and workability is excellent. Moreover, as a result of adjusting the circumferential position of the connection terminal 50 with respect to the circuit board 70, even if the circumferential position of the connection terminal 50 is displaced with respect to the stator 30, by adjusting the length of the coil lead-out wire 33*c* between the coil body 33*a* and the connection terminal 50 as appropriate as described above, it is possible to easily connect the coil lead-out wire 33*c* to the connection terminal 50. Thus, it is possible to simplify the work of connecting the coil 33 to the connection terminal 50. As a result, in this embodiment, even if the stator 30 is fixed to the motor housing 11 with its circumferential position displaced with respect to the motor housing 11, it is possible to simplify the work of connecting the coil 33 and the circuit board 70 through the connection terminal 50. Thus, it is possible to suppress an increase of manufacturing man-hours of the motor 2 and the pump 1.

According to this embodiment, the stator 30 has the mounting recess 30*a* recessed from the outer side surface of the stator 30 toward the radially inner side and extending in the circumferential direction. The terminal holder 15 has the body 16 that extends in the circumferential direction and is arranged on the upper side, namely the axial one side, of the stator core 31, and the claw 18 that extends from the body 16 to the lower side, namely the axial other side. The claw 18 has the protrusion 18*a* that protrudes toward the radially inner side, and the protrusion 18*a* is provided inside the mounting recess 30*a*. Thus, in a process of connecting the circuit board 70 and the connection terminal 50, the terminal holder 15 is moved in the circumferential direction along the outer side surface of the stator 30, so the circumferential position of the connection terminal 50 relative to the circuit board 70 is able to be adjusted. Thus, when the terminal holder 15 is moved in the circumferential direction, it is possible to suppress displacement of the radial position of the connection terminal 50 with respect to the circuit board 70, and to connect the circuit board 70 and the connection terminal 50 more easily. As a result, it is possible to suppress an increase in the manufacturing man-hours of the motor 2 and the pump 1 more suitably.

According to this embodiment, the stator 30 has the multiple mounting recesses 30*a* arranged at intervals along the circumferential direction. The terminal holder 15 has the multiple claws 18 arranged at intervals along the circumferential direction. Each protrusion 18*a* of the multiple claws 18 is arranged inside each of the multiple mounting recesses 30*a*. The circumferential dimension of the protrusions 18*a* is smaller than the circumferential dimension of the mounting recesses 30*a*, and when viewed from the circumferential direction, each protrusion 18*a* overlaps the restriction surface 30*b*, which is a surface facing the circumferential direction in the inner side surface of the mounting recess 30*a*. Thus, as described above, the moving distance of the terminal holder 15 in the circumferential direction with respect to the stator 30 is able to be restricted by the restriction surface 30*b*. Therefore, in a process of connecting the circuit board 70 and the connection terminal 50, when adjusting the circumferential position of the connection terminal 50 with respect to the circuit board 70, it is possible to suppress the connection terminal 50 from moving too much in the circumferential direction. As a result, it is possible to adjust the circumferential position of the connection terminal 50 with respect to the circuit board 70 more easily, and thereby it is possible to connect the circuit board 70 and the connection terminal 50 more easily. Thus, it is possible to suppress an increase in manufacturing man-hours of the motor 2 and the pump 1 more suitably.

According to this embodiment, the support surface 32*b*, which is a surface facing the lower side, namely the axial other side, in the inner side surface of the mounting recess 30*a*, is provided on the outer side surface of the insulator 32. The claw 18 is elastically deformable toward the radially outer side, and the support surface 32*b* supports the protrusion 18*a* in the axial direction. Accordingly, in a process of mounting the terminal holder 15 to the stator 30, when moving the terminal holder 15 toward the lower side from the upper side of the stator 30 fixed to the motor housing 11 beforehand, if the protrusion 18*a* of the claw 18 contacts with the outer side surface of the annular wall 32*a* of the insulator 32, the claw 18 is elastically deformed toward the radially outer side. Thereby, when inserting the claw 18 into the space between the annular wall 32*a* and the peripheral wall 11*a*, it is possible to prevent the claw 18 from being caught by the surface of the annular wall 32*a* facing the upper side, so it is possible to insert the claw 18 into the space between the annular wall 32*a* and the peripheral wall 11*a* easily. Moreover, when moving the terminal holder 15 toward the lower side to a position where the protrusion 18*a* faces the mounting recess 30*a* in the radial direction, it is possible to arrange the protrusion 18*a* inside the mounting recess 30*a* by the restoring force of the claw 18 directed toward the radially inner side. At this time, since the support surface 32*b* support the protrusion 18*a* in the axial direction, it is possible to determine the axial position of the terminal holder 15 with respect to the stator 30, and to mount the terminal holder 15 on the stator 30. Thus, in this embodiment, the terminal holder 15 is able to be mounted on the stator 30 only by the work of moving the terminal holder 15 toward the lower side, it is possible to simplify the work of mounting the terminal holder 15 to the stator 30. As a result, it is possible to suppress an increase in the manufacturing man-hours of the motor 2 and the pump 1.

Moreover, in this embodiment, it is possible to prevent the terminal holder 15 from moving in the axial direction relative to the stator 30, so it is possible to determine the axial position of the connection terminal 50 relative to the circuit board 70 with high accuracy. As a result, the connection terminal 50 is able to be connected to the circuit board 70 more easily, and so it is possible to suppress increase of assembling man-hours of the motor 2 and the pump 1 more suitably.

According to this embodiment, the terminal holder 15 holds the multiple connection terminals 50, and has an annular shape centered on the central axis J. Thus, since the terminal holder 15 is constituted of one member, it is possible to mount multiple connection terminals 50 on the stator 30 only by the work of mounting one member to the stator 30. Thus, since it is possible to simplify the work of mounting multiple connection terminals 50 to the stator 30, and so it is possible to suppress an increase in the number of manufacturing man-hours of the motor 2 and the pump 1 more suitably.

According to this embodiment, the terminal holder 15 has the terminal holding part 17 that holds the connection terminal 50. The terminal holding part 17 has the holding hole 17*a* recessed from a surface facing the upper side, namely the axial one side, of the terminal holding part 17, toward the lower side, namely the axial other side. The connection terminal 50 has the terminal body 51 that extends in the axial direction, and the connection part 52 that extends to the lower side from the terminal body 51 and that is connected to the coil 33. The connection part 52 is held in the holding hole 17*a*. Thus, in the process of mounting the connection terminal 50 to the terminal holder 15, it is possible to mount the connection terminal 50 on the terminal holder 15 only by the work of moving the connection terminal 50 toward the lower side from the upper side of the terminal holder 15 and inserting the connection part 52 into the holding hole 17*a*. As a result, it is possible to simplify the work of mounting the connection terminal 50 on the terminal holder 15, and so it is possible to suppress an increase in the number of manufacturing man-hours of the motor 2 and the pump 1 more suitably.

Moreover, in this embodiment, since the connection part 52 is held in the holding hole 17*a*, it is possible to determine the position of the connection part 52 relative to the terminal holder 15 with high accuracy. Thus, it is possible to stabilize the connection between the connection part 52 and the coil lead-out wire 33*c*, and so the coil 33 and the circuit board 70 are able to be connected stably through the connection terminal 50. As a result, it is possible to drive the motor 2 and the pump 1 stably and to enhance the output efficiency of the motor 2.

According to this embodiment, the connection part 52 has: the press-contact part 52*a* recessed from the lower side, namely the axial other side, of the connection part 52 toward the upper side, namely the axial one side, and open at both sides in the radial direction; and the first press-fit parts 52*d* and 52*e* press-fitted into holding holes 17*a*. The coil 33 has the coil lead-out wire 33*c* which is led out from the coil body 33*a*. The coil lead-out wire 33*c* is passed through the inside of the press-contact part 52*a* in the radial direction and press-fitted into the press-contact part 52*a*. Thus, in the process of mounting the connection terminal 50 to the terminal holder 15, it is possible to press-fit the connection part 52 into the holding hole 17*a* only by the work of moving the connection terminal 50 from the upper side of the terminal holder 15 to the lower side and inserting the connection part 52 into the holding hole 17*a*. Thus, it is possible to simplify the work of mounting the connection terminal 50 to the terminal holder 15, and to mount the connection terminal 50 on the terminal holder 15 firmly.

Moreover, in this embodiment, in the process of mounting the connection terminal 50 to the terminal holder 15, only by the work of arranging the coil lead-out wire 33*c* led out in the radial direction on the upper side of the holding hole 17*a*, and at the same time moving the connection terminal 50 from the upper side of the terminal holder 15 to the lower side and inserting the connection part 52 into the holding hole 17*a*, the coil lead-out wire 33*c* is able to be press-fitted into the press-contact part 52*a*, such that the coil lead-out wire 33*c* is connected to the connection terminal 50. That is, by one work of inserting the connection part 52 into the holding hole 17*a*, the connection terminal 50 is able to be mounted on the terminal holder 15 and the coil lead-out wire 33*c* and the connection terminal 50 are able to be connected, so it is possible to suppress an increase in manufacturing man-hours of the motor 2 and the pump 1 more suitably.

Moreover, in this embodiment, since the coil lead-out wire 33*c* is press-fitted into the press-contact part 52*a*, the coil lead-out wire 33*c* is able to be fixed to the connection part 52 firmly. Therefore, it is possible to stabilize the connection between the coil lead-out wire 33*c* and the connection terminal 50. Further, since the contact area of the coil lead-out wire 33*c* and the connection terminal 50 is able to be enlarged, it is possible to reduce contact resistance between the coil lead-out wire 33*c* and the connection terminal 50. Thereby, the coil 33 and the circuit board 70 are able to be connected stably via the connection terminal 50, so it is possible to drive the motor 2 and the pump 1 more stably, and to further enhance the output efficiency of the motor 2.

According to this embodiment, the connection part 52 has a plate shape with a plate surface facing the radial direction, and the radial dimension of the holding hole 17*a* is larger than the radial dimension of the connection part 52. If the circumferential dimension of the holding hole 17*a* relative to the circumferential dimension of the connection part 52 becomes too small due to the dimensional variation of the holding hole 17*a* and the connection part 52, there is a risk that the pressurizing force required for press-fitting the connection part 52 into the holding hole 17*a* increases. On the other hand, in this embodiment, as described above, the radial dimension of the holding hole 17*a* is larger than the radial dimension of the connection part 52, so when the circumferential force applied to the first part 52*b* and the second part 52*c* of the connection part 52 becomes too large, the first part 52*b* and the second part 52*c* are able to be displaced in the radial direction, so it is possible to suppress an increase in the circumferential force applied to the first part 52*b* and the second part 52*c* relatively. Thereby, it is possible to suppress an increase in the pressurizing force required for press-fitting the connection part 52 into the holding hole 17*a*, and so it is possible to easily mount the connection terminal 50 on the terminal holder 15. As a result, it is possible to suppress an increase in the manufacturing man-hours of the motor 2 and the pump 1 more suitably.

Moreover, in this embodiment, as described above, even if the circumferential dimension of the holding hole 17*a* relative to the circumferential dimension of the connection part 52 is too small, the circumferential force applied to each first part 52*b* and the second part 52*c* is able to be reduced, and so it is possible to suppress excessive increase in the circumferential pressure applied to the coil lead-out wire 33*c* press-fitted into the press-contact part 52*a*. Thus, it is possible to prevent the coil lead-out wire 33*c* from being damaged, and so it is possible to electrically connect the coil 33 and the circuit board 70 stably. As a result, it is possible to drive the motor 2 and the pump 1 stably, and enhance the output efficiency of the motor 2.

According to this embodiment, the terminal holding part 17 has the groove 17*c* recessed from the upper side, namely the axial one side, toward the lower side, namely the axial other side, and traversing the holding hole 17*a* in the radial direction. When viewed in the radial direction, the press-contact part 52*a* overlaps the groove 17*c*, and the coil lead-out wire 33*c* is passed through the inside of the groove 17*c*. Thus, in the process of connecting the coil lead-out wire 33*c* to the connection terminal 50, by passing the coil lead-out wire 33*c* in the radial direction through the inside of the groove 17*c*, the circumferential position of the coil lead-out wire 33*c* with respect to the holding hole 17*a* is able to be determined with high accuracy. Therefore, when inserting the connection part 52 into the holding hole 17*a*, it is possible to press-fit the coil lead-out wire 33*c* into the press-contact part 52*a* more easily. As a result, since the coil 33 and the connection terminal 50 are able to be connected more easily, it is possible to suppress an increase of manufacturing man-hours of the motor 2 and the pump 1 more suitably.

According to this embodiment, the terminal holder 15 has the notch 16*b* recessed in the radial direction. Thus, by a simple work of moving a jig or the like in the circumferential direction while hooking the notch 16*b* to the jig or the like, the terminal holder 15 is movable in the circumferential direction with respect to the stator 30, and the circumferential position of the connection terminal 50 with respect to the circuit board 70 is able to be adjusted easily. As a result, it is possible to suppress an increase in the manufacturing man-hours of the motor 2 and the pump 1.

Moreover, in this embodiment, the coil 33 is constituted of a coil wire whose circumference of the copper wire is covered with an insulating film such as enamel. When such a coil wire is used, a method for electrically connecting the coil lead-out wire 33*c* to the connection terminal 50 generally includes a method for connecting the coil lead-out wire 33*c* to the connection terminal 50 after removing an insulating film at least at a part in contact with the press-contact part 52*a* beforehand, and a method for performing connection welding such as fusing welding, in which the copper wire is able to be connected to the connection terminal 50 while melting the enamel wire.

On the other hand, in this embodiment, as described above, the corner 52*m* having a sharp shape toward the inside of the circumferential one side (+θ side) and the corner 52*n* having a sharp shape toward the circumferential other side (−θ side) are defined in the press-contact part 52*a*. The corners 52*m* and 52*n* face each other in the radial direction, and the gap between the corners 52*m* and 52*n* is smaller than the diameter of the coil lead-out wire 33*c*. Thus, by inserting the coil lead-out wire 33*c* from which the insulating film has not been removed into the inside of the press-contact part 52*a* from the lower side of the connection part 52, the insulating film of the coil lead-out wire 33*c* is able to be torn by the corners 52*m* and 52*n*, and so the press-contact part 52*a* and the copper wire of the coil lead-out wire 33*c* are able to be brought into contact with each other. Thereby, in the process of connecting the coil lead-out wire 33*c* to the connection terminal 50, the work of removing the insulating film of the coil lead-out wire 33*c* becomes unnecessary, so it is possible to simplify the work of connecting the coil lead-out wire 33*c* to the connection terminal 50. Moreover, since the coil lead-out wire 33*c* is able to be connected to the connection terminal 50 only by the simple work of inserting the coil lead-out wire 33*c* into the press-contact part 52*a*, it is possible to simplify the work of connecting the coil lead-out wire 33*c* to the connection terminal 50 compared with the case of performing the work of connection welding such as fusing welding. As a result, it is possible to suppress an increase in the manufacturing man-hours of the motor 2 and the pump 1 more suitably.

Second Embodiment

Figure 13:
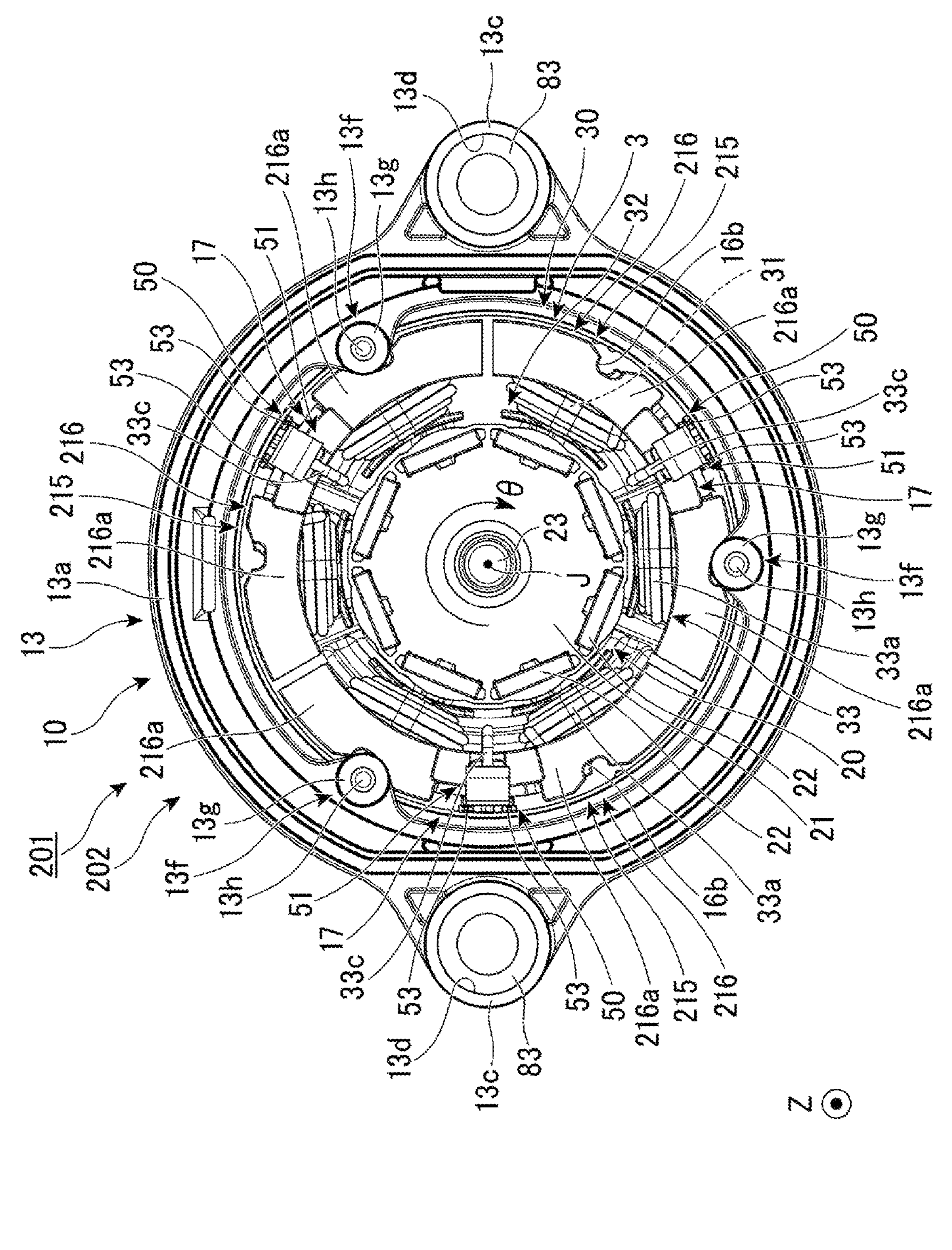
FIG. 13 is a top view showing a portion of a pump of a second embodiment.

As shown in FIG. 13, a motor 202 of this embodiment is provided with multiple terminal holders 215. In this embodiment, the motor 202 is provided with three terminal holders 215. In the following description, the same reference numeral is given to the component of the same reference numeral as the first embodiment, and the description is omitted.

In this embodiment, each terminal holder 215 has a substantially circular arc shape centered on the central axis J. In this embodiment, the center angle of each terminal holder 215 is about 115°. Moreover, the center angles of the terminal holders 215 may be mutually different angles. The terminal holders 215 are arranged at intervals along the circumferential direction. Each terminal holder 215 has a body 216, the terminal holding part 17, and a claw (not shown) in the figure. The configuration of the terminal holding part 17 of this embodiment is identical to the configuration of the terminal holding part 17 of the first embodiment.

In this embodiment, the body 216 is a plate shape that extends in the circumferential direction. In this embodiment, the body 216 is composed of a pair of extension parts 216*a*. Each pair of extension parts 216*a* has a plate shape that extends in the circumferential direction centered on the central axis J. The plate surfaces of the pair of extension parts 216*a* face the axial direction. When viewed in the axial direction, the outer side surfaces of the pair of extension parts 216*a* facing the radially outer side have an arc shape centered on the central axis J. When viewed in the axial direction, the inner side surfaces of the pair of extension parts 216*a* facing the radially inner side have arc shapes centered on the central axis J. When viewed in the axial direction, the angle defined by a straight line connecting the central axis J and the end of the extension part 216*a* on the circumferential one side (+θ side) and a straight line connecting the central axis J and the end of the extension part 216*a* on the circumferential other side (−θ side) is about 45°. The pair of extension parts 216*a* are arranged at intervals along the circumferential direction. The pair of extension parts 216*a* are arranged so as to sandwich the terminal holding part 17 in the circumferential direction. The pair of extension parts 216*a* are connected to the terminal holding part 17 in the circumferential direction. The terminal holding part 17 of each terminal holder 215 holds the connection terminal 50. Moreover, the claws (not shown) may be provided on the pair of extension parts 216*a*, respectively, or may be provided on only one of the extension parts 216*a*.

The motor 202 according to this embodiment is provided with the multiple terminal holders 215 for holding the connection terminal 50. Each of the multiple terminal holders 215 has an arc shape centered on the central axis J, and the multiple terminal holders 215 are arranged along the circumferential direction. In a case where the terminal holder has an annular shape, when mounting the terminal holder to the stator 30, there is a need to arrange the protrusions of the multiple claws arranged surrounding the stator 30 almost simultaneously inside the mounting recess 30*a* of the stator 30. Therefore, in a process of mounting the terminal holder on the stator 30, it is necessary to move the terminal holder toward the lower side from the upper side of the stator 30, while making the center of the terminal holder and the center of the stator 30 precisely aligned. On the other hand, in this embodiment, since each terminal holder 215 has a circular arc shape, the claw of each terminal holder 215 is not arranged surrounding the stator 30. Therefore, in a process of mounting the terminal holder 215 to the stator 30, for example, the claw of the terminal holder 215 is located further on the radially outer side than the stator 30, and at the same time, the terminal holder 215 is moved toward the lower side, and after the protrusion of the claw faces the mounting recess 30*a* in the radial direction, the terminal holder 215 is moved toward the radially inner side and the protrusion is arranged inside the mounting recess 30*a*, thereby the terminal holder 215 is able to be mounted on the stator 30. Thus, when moving the terminal holder 215 from the upper side of the stator 30 to the lower side, there is no need to precisely align the center of the terminal holder 215 with the center of the stator 30, so it is possible to simplify the work of mounting the terminal holder 215 to the stator 30. As a result, it is possible to suppress an increase in the manufacturing man-hours of the motor 202 and a pump 201.

Moreover, the number of the terminal holders 215 possessed by the motor 202 is not limited to three, but may be two or four or more. Even in these cases, it is possible to simplify the work of mounting the terminal holder 215 to the stator 30.

Third Embodiment

Figure 14:
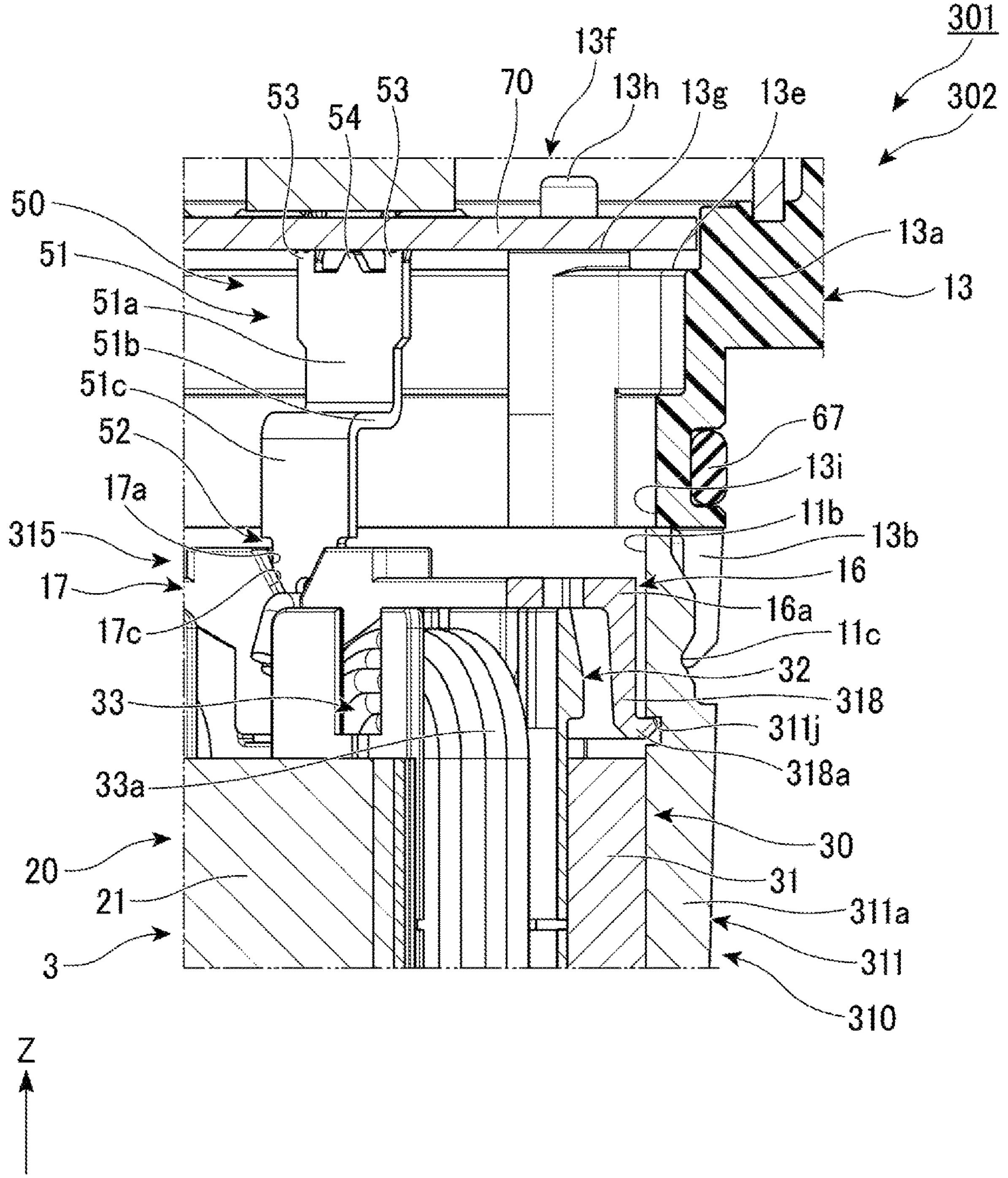
FIG. 14 is a cross-sectional view showing a portion of a pump of a third embodiment.

As shown in FIG. 14, a motor housing 311 of a housing 310 of this embodiment has a mounting recess 311*j*, and a protrusion 318*a* of a terminal holder 315 is arranged inside the mounting recess 311*j*. In the following description, the same reference numeral is given to the component of the same reference numeral as the first embodiment, and the description is omitted.

The mounting recess 311*j* is a hole recessed from the inner side surface of a peripheral wall 311*a* toward the radially outer side. That is, the mounting recess 311*i* is a hole recessed from the inner side surface of the motor housing 311 toward the radially outer side. The mounting recess 311*j* extends in the circumferential direction. Although not shown, the mounting recess 311*i* has a substantially rectangular shape when viewed in the radial direction. Although not shown, the surface in the inner side surface of the mounting recess 311*j* facing the circumferential direction is a restriction surface. The mounting recess 311*i* has two restriction surfaces. One restriction surface faces the circumferential one side (+θ side), and the other restriction surface faces the circumferential other side (−θ side). Although not shown, in this embodiment, multiple mounting recesses 311*j* are provided in the peripheral wall 311*a*. In this embodiment, three mounting recesses 311*j* are provided in the peripheral wall 311*a*. The mounting recesses 311*j* are arranged at substantially equal intervals along the circumferential direction.

In this embodiment, the terminal holder 315 has the body 16, the terminal holding part 17, and a claw 318. The configuration or the like of the body 16 and the terminal holding part 17 in this embodiment are the same as the configuration or the like of the body 16 and the terminal holding part 17 in the first embodiment.

The claw 318 has a plate shape that extends from the body 16 to the lower side, namely the axial one side. The claw 318 is arranged on the radially outer side of the annular wall 32*a* and on the radially inner side of the peripheral wall 11*a*. The plate surface of the claw 318 faces the radial direction. Although not shown, in this embodiment, the terminal holder 315 has multiple claws 318. In this embodiment, the terminal holder 315 has three claws 318. The multiple claws 318 are arranged at intervals along the circumferential direction.

The claw 318 has the protrusion 318*a* protruding toward the radially outer side. The protrusion 318*a* protrudes toward the radially outer side from the lower edge of the claw 318. Each protrusion 318*a* is arranged inside a different mounting recess 311*j*. In this embodiment, each claw 318 is elastically deformable toward the radially outer side. Therefore, it is possible to suppress the movement of each protrusion 318*a* to the radially outer side. Moreover, the surface in the inner side surface of each mounting recess 311*j* facing the lower side contacts the protrusions 318*a* in the axial direction and supports the protrusions 318*a* in the axial direction. Thereby, the terminal holder 315 is mounted on the motor housing 311.

Although not shown, in this embodiment, the circumferential dimension of each protrusion 318*a* is smaller than the circumferential dimension of the mounting recess 311*j*. Therefore, the terminal holder 315 is moveable in the circumferential direction with respect to the motor housing 311. Although not shown, each protrusion 318*a* overlaps the restriction surface of the mounting recess 311*j*. Therefore, as in the first embodiment, it is possible to restrict the moving distance of the terminal holder 315 in the circumferential direction with respect to the motor housing 311 by the restriction surface.

According to this embodiment, a motor 302 includes the terminal holder 315 that holds the connection terminal 50 mounted on the motor housing 311 and movable in the circumferential direction. Thus, it is possible to adjust the circumferential position of the connection terminal 50 with respect to the circuit board 70, and so it is possible to simplify the work of connecting the connection terminal 50 to the circuit board 70. Moreover, as a result of adjusting the circumferential position of the connection terminal 50 with respect to the circuit board 70, even if the circumferential position of the connection terminal 50 with respect the stator 30 is displaced, it is possible to connect the coil lead-out wire 33*c* to the connection terminal 50 easily by appropriately adjusting the length of the coil lead-out wire 33*c* between the coil body 33*a* and the connection terminal 50, as described above. As a result, it is possible to simplify the work of connecting the coil 33 to the connection terminal 50. From the above, in this embodiment, it is possible to simplify the work of connecting the coil 33 and the circuit board 70 through the connection terminal 50 even if the stator 30 is fixed to the motor housing 311 with its circumferential position displaced with respect to the motor housing 311. Thus, it is possible to suppress an increase in manufacturing man-hours of the motor 302 and a pump 301.

According to this embodiment, the motor housing 311 has the mounting recess 311*j* recessed from the inner side surface of the motor housing 311 toward the radially outer side and extending in the circumferential direction. The terminal holder 315 has: the body 16 that extends in the circumferential direction and is arranged on the upper side, namely the axial one side, of the stator core 31; and the claw 318 that extends from the body 16 to the lower side, namely the axial other side. The claw 318 has the protrusion 318*a* that protrudes toward the radially outer side, and the protrusion 318*a* is arranged inside the mounting recess 311*j*. Thus, in the process of connecting the circuit board 70 and the connection terminal 50, the terminal holder 315 is able to be moved in the circumferential direction along the inner side surface of the motor housing 311. Accordingly, when moving the terminal holder 315 in the circumferential direction, it is possible to suppress displacement of the radial position of the connection terminal 50 with respect to the circuit board 70, so it is possible to connect the circuit board 70 and the connection terminal 50 more easily. As a result, it is possible to suppress an increase in the manufacturing man-hours of the motor 302 and the pump 301 more suitably.

Other configurations and other methods may be employed within the scope of the technical ideas of this disclosure, not limited to the embodiment described above. For example, the number of terminal holding parts that the terminal holder has may not be limited to three, and may be two or less, or four or more. Moreover, the number of connection terminals of the motor is not limited to three, but may be two or less, or four or more. Further, the number of coil lead-out wires connected to the connection terminal may be one, or three or more.

Moreover, the number of flanges of the board accommodator may be three or more. Further, the flange may be provided on the lid or on the motor housing.

Moreover, the method for connecting the board connection part 53 and the second via hole 70*b* is not limited to press-fitting, and connection by other method such as soldering is possible.

The application of the motor is not particularly limited. The motor may be installed on a device other than the pump. The use of the pump equipped with the motor to which this disclosure is applied is not particularly limited. The type of fluid sent by the pump is not particularly limited, and may be water or the like. The motor and the pump may be installed on device other than the vehicle. Moreover, each configuration and methods described in this specification may be combined as appropriate within a range that does not conflict with each other.

Further, this technology may have the following configuration. (1) A motor, including: a motor part having a rotor rotatable about a central axis and a stator facing the rotor in a radial direction with a gap therebetween; a circuit board arranged on an axial one side of the motor part; a connection terminal arranged between the stator and the circuit board in an axial direction; and a motor housing having a cylindrical shape that extends in the axial direction and accommodating the motor part. The stator includes an annular stator core; a coil having multiple coil bodies attached to the stator core; and an insulator arranged between the stator core and the coil. The connection terminal electrically connects the coil and the circuit board. The motor includes a terminal holder, which holds the connection terminal and is mounted on either the stator or the motor housing and moveable in a circumferential direction. (2) The motor according to (1), wherein the stator has a mounting recess recessed from an outer side surface of the stator toward a radially inner side and extending in the circumferential direction. The terminal holder includes: a body extending in the circumferential direction and arranged on an axial one side of the stator core, and a claw extending from the body to an axial other side. The claw has a protrusion protruding toward the radially inner side. The protrusion is arranged inside the mounting recess. (3) The motor according to (2), wherein the stator includes multiple mounting recesses arranged at intervals along the circumferential direction. The terminal holder includes multiple claws arranged at intervals along the circumferential direction. The protrusion of each of the multiple claws is arranged inside of each of the multiple mounting recesses. A circumferential dimension of the protrusion is smaller than a circumferential dimension of the mounting recess. When viewed in the circumferential direction, each of the protrusions overlaps with a surface in an inner side surface of the mounting recess facing the circumferential direction. (4) The motor according to (2) or (3), wherein a support surface, which is a surface in an inner side surface of the mounting recess facing an axial other side, is provided on an outer side surface of the insulator. The claw is elastically deformable toward a radially outer side. The support surface supports the protrusion in the axial direction. (5) The motor according to (1), wherein the motor housing has a mounting recess recessed from an inner side surface of the motor housing toward a radially outer side and extending in the circumferential direction. The terminal holder includes: a body extending in the circumferential direction and arranged on the axial one side of the stator core, and a claw extending from the body to the axial other side. The claw has a protrusion protruding toward the radially outer side. The protrusion is arranged inside the mounting recess. (6) The motor according to any one of (2) to (5), wherein the terminal holder holds multiple connection terminals, and has an annular shape centered on the central axis. (7) The motor according to any one of (2) to (5), including multiple terminal holders for holding the connection terminal. Each of the multiple terminal holders has an arc shape centered on the central axis, and the multiple terminal holders are arranged along the circumferential direction. (8) The motor according to any one of (1) to (7), wherein the terminal holder includes a terminal holding part for holding the connection terminal. The terminal holding part has a holding hole recessed from a surface facing an axial one side of the terminal holding part toward the axial other side. The connection terminal includes a terminal body extending in the axial direction, and a connection part extending from the terminal body to the axial other side and connected to the coil. The connection part is held in the holding hole. (9) The motor according to (8), wherein the connection part includes: a press-contact part recessed from an axial other side of the connection part to an axial one side and open at both sides in the radial direction; and a first press-fit part press-fitted into the holding hole. The coil includes a coil lead-out wire led out from the coil body. The coil lead-out wire is passed through the inside of the press-contact part in the radial direction and press-fitted into the press-contact part. (10) The motor according to (9), wherein the connection part has a plate shape with a plate surface facing the radial direction, and a radial dimension of the holding hole is larger than a radial dimension of the connection part. (11) The motor according to (9) or (10), wherein terminal holding part has a groove recessed from the axial one side to the axial other side and traversing the holding hole in the radial direction. When viewed in the radial direction, the press-contact part overlaps the groove. The coil lead-out wire is passed through inside of the groove. (12) A motor according to any one of (8) to (11), wherein the terminal holding part is arranged between the coil bodies adjacent to each other in the circumferential direction. (13) The motor according to any one of (1) to (12), wherein the terminal holder and has a notch recessed in the radial direction. (14) A pump, including a motor according to any one of (1) to (13) and a pump mechanism connected to the rotor.

Features of the above-described preferred embodiments and the modifications thereof may be combined appropriately as long as no conflict arises. While preferred embodiments of the present disclosure have been described above, it is to be understood that variations and modifications will be apparent to those skilled in the art without department from the scope and spirit of the present disclosure. The scope of the present disclosure, therefore, is to be determined solely by the following claims.

What is claimed is:

1. A motor, comprising:

a motor part having a rotor rotatable about a central axis, and a stator facing the rotor in a radial direction with a gap therebetween;

a circuit board arranged on an axial one side of the motor part;

a connection terminal arranged between the stator and the circuit board in an axial direction; and a motor housing having a cylindrical shape that extends in the axial direction and accommodating the motor part, wherein the stator comprises:

an annular stator core;

a coil having a plurality of coil bodies attached to the stator core; and an insulator arranged between the stator core and the coil, wherein the connection terminal electrically connects the coil and the circuit board, and wherein the motor comprises a terminal holder, which holds the connection terminal, wherein the terminal holder has a claw, and the terminal holder is mounted on either the stator or the motor housing by the claw and movable in a circumferential direction.

2. The motor according to claim 1, wherein the stator has a mounting recess recessed from an outer side surface of the stator toward a radially inner side and extending in the circumferential direction, the terminal holder comprises: a body extending in the circumferential direction and arranged on an axial one side of the stator core, and the claw extending from the body to an axial other side, the claw has a protrusion protruding toward the radially inner side, and the protrusion is arranged inside the mounting recess.

3. The motor according to claim 2, wherein the stator comprises a plurality of the mounting recesses arranged at intervals along the circumferential direction, the terminal holder comprises a plurality of the claws arranged at intervals along the circumferential direction, the protrusion of each of the plurality of the claws is arranged inside each of the plurality of the mounting recesses, a circumferential dimension of the protrusion is smaller than a circumferential dimension of the mounting recess, and when viewed in the circumferential direction, each of the protrusions overlaps a surface in an inner side surface of the mounting recess facing the circumferential direction.

4. The motor according to claim 2, wherein a support surface, which is a surface in an inner side surface of the mounting recess facing an axial other side, is provided on an outer side surface of the insulator, the claw is elastically deformable toward an radially outer side, and the support surface supports the protrusion in the axial direction.

5. The motor according to claim 2, wherein the terminal holder holds a plurality of the connection terminals, and has an annular shape centered on the central axis.

6. A motor according to claim 2, comprising:

a plurality of the terminal holders for holding the connection terminal, wherein each of the plurality of the terminal holders has an arc shape centered on the central axis, and the plurality of the terminal holders are arranged along the circumferential direction.

7. A motor according to claim 1, wherein the motor housing has a mounting recess recessed from an inner side surface of the motor housing toward an radially outer side and extending in the circumferential direction, the terminal holder comprises: a body extending in the circumferential direction and arranged on the axial one side of the stator core; and a claw extending from the body to an axial other side, the claw has a protrusion protruding toward a radially outer side, and the protrusion is arranged inside the mounting recess.

8. The motor according to claim 1, wherein the terminal holder comprises a terminal holding part for holding the connection terminal, the terminal holding part has a holding hole recessed from a surface facing an axial one side of the terminal holding part toward an axial other side, the connection terminal comprises a terminal body extending in the axial direction, and a connection part extending from the terminal body to the axial other side and connected to the coil, and the connection part is held in the holding hole.

9. The motor according to claim 8, wherein the connection part comprises:

a press-contact part recessed from an axial other side of the connection part to an axial one side and open at both sides in a radial direction; and a first press-fit part press-fitted into the holding hole, wherein the coil comprises a coil lead-out wire led out from the coil body, and wherein the coil lead-out wire is passed through inside of the press-contact part in the radial direction and press-fitted into the press-contact part.

10. The motor according to claim 9, wherein the connection part has a plate shape with a plate surface facing the radial direction, and a radial dimension of the holding hole is larger than a radial dimension of the connection part.

11. The motor according to claim 9, wherein the terminal holding part has a groove recessed from the axial one side to the axial other side and traversing the holding hole in the radial direction, when viewed in the radial direction, the press-contact part overlaps the groove, and the coil lead-out wire is passed through inside of the groove.

12. The motor according to claim 8, wherein the terminal holding part is arranged between the coil bodies adjacent to each other in the circumferential direction.

13. The motor according to claim 1, wherein the terminal holder has a notch recessed in the radial direction.

14. A pump, comprising:

a motor according to claim 1, and a pump mechanism connected to the rotor.

* * * * *